United States Patent
Rose et al.

(10) Patent No.: US 7,069,228 B1
(45) Date of Patent: Jun. 27, 2006

(54) APPARATUS AND METHOD FOR AN INTERNET BASED COMPUTER RESERVATION BOOKING SYSTEM

(76) Inventors: James W. Rose, 923 Elm St., San Carlos, CA (US) 94070; Theodore C. Chen, 2325 Devarona Pl., Santa Clara, CA (US) 95050

(*) Notice: Subject to any disclaimer, the term of this patent is extended or adjusted under 35 U.S.C. 154(b) by 550 days.

(21) Appl. No.: 09/302,034

(22) Filed: Apr. 29, 1999

Related U.S. Application Data

(60) Provisional application No. 60/083,651, filed on Apr. 30, 1998.

(51) Int. Cl.
*G06Q 10/00* (2006.01)

(52) U.S. Cl. .......................................................... 705/5
(58) Field of Classification Search ................... 705/5, 705/6, 27, 28
See application file for complete search history.

(56) References Cited

U.S. PATENT DOCUMENTS

| | | | |
|---|---|---|---|
| 3,688,276 A | * | 8/1972 | Quinn ....................... 358/1.18 |
| 5,237,499 A | | 8/1993 | Garback |
| 5,253,165 A | * | 10/1993 | Leiseca et al. ................. 705/5 |
| 5,311,425 A | | 5/1994 | Inada |
| 5,422,809 A | | 6/1995 | Griffin et al. |
| 5,502,806 A | | 3/1996 | Mahoney et al. |
| 5,537,533 A | * | 7/1996 | Staheli et al. ................... 714/5 |
| 5,559,707 A | | 9/1996 | DeLorme et al. |
| 5,596,636 A | * | 1/1997 | Davies et al. .......... 379/216.01 |
| 5,634,016 A | * | 5/1997 | Steadham, Jr. et al. ..... 345/329 |
| 5,701,457 A | | 12/1997 | Fujiwara |
| 5,794,207 A | | 8/1998 | Walker et al. |
| 5,802,492 A | | 9/1998 | DeLorme et al. |

(Continued)

FOREIGN PATENT DOCUMENTS

JP 07028909 1/1995

(Continued)

OTHER PUBLICATIONS

Computer World—v29/n27/p. 60 Jul. 3, 1995—Ellis Book "Choice Hotels Open Doors to the Internet".*

(Continued)

*Primary Examiner*—Thomas A. Dixon
(74) *Attorney, Agent, or Firm*—James W. Rose

(57) ABSTRACT

The present invention is a software product that provides merchants that sell time-slot inventories tools to capitalize on the Internet revolution. The present invention enables the creation of web-sites for merchants with a built-in web-based reservation booking system. This offers customers the on-line benefits of access, selection and immediacy in making real-time reservation/appointments over the Internet. The software product also simplifies the merchant's booking process by providing a central web-based reservation/appointment management system that can be used for all bookings, regardless if made by telephone, by a walk-in customer, or by a customer via the Internet. The software product also provides the merchant with a powerful direct marketing tool. As a merchant uses the software product, user-customer profiles and demographics are captured in the database module, thus creating (in Web jargon) a "community" of customers specific to the merchant. The merchant is thus empowered, using the mail module, to directly communicate with its customer base, using customer profiles and demographics to create a highly targeted and effective marketing and promotional ad campaign. The software product also allows the merchant to auction off time-slot inventory over the Internet. Lastly, the software product enables the creation of Web "super-communities" consisting of the aggregate of all the individual merchant's customer-communities using the software product.

88 Claims, 30 Drawing Sheets

U.S. PATENT DOCUMENTS

| | | | |
|---|---|---|---|
| 5,832,452 A * | 11/1998 | Schneider et al. | 705/5 |
| 5,832,454 A | 11/1998 | Jafri et al. | |
| 5,850,214 A * | 12/1998 | McNally et al. | 345/173 |
| 5,850,433 A | 12/1998 | Rondeau | |
| 5,855,006 A * | 12/1998 | Huemoeller et al. | 705/9 |
| 5,864,818 A * | 1/1999 | Feldman | 705/5 |
| 5,909,668 A * | 6/1999 | Fukuma | 705/5 |
| 5,940,803 A | 8/1999 | Kanemitsu | |
| 5,948,040 A | 9/1999 | DeLorme et al. | |
| 5,953,706 A | 9/1999 | Patel | |
| 5,960,406 A | 9/1999 | Rasansky et al. | |
| 5,963,913 A * | 10/1999 | Henneuse | 705/9 |
| 5,978,770 A * | 11/1999 | Waytena et al. | 705/5 |
| 5,983,200 A | 11/1999 | Slotznick | |
| 5,987,421 A | 11/1999 | Chuang | |
| 6,002,915 A | 12/1999 | Shimizu | |
| 6,041,305 A * | 3/2000 | Sakurai | 705/5 |
| 6,079,863 A * | 6/2000 | Furukawa et al. | 364/407 |
| 6,094,640 A | 7/2000 | Goheen | |
| 6,112,185 A | 8/2000 | Walker et al. | |
| 6,119,096 A * | 9/2000 | Mann et al. | 705/5 |
| 6,345,260 B1 * | 2/2002 | Cummings | 705/8 |
| 6,658,093 B1 * | 12/2003 | Langseth et al. | 379/88.17 |

FOREIGN PATENT DOCUMENTS

| | | | |
|---|---|---|---|
| JP | 05195848 | | 2/1995 |
| JP | 07080116 | | 3/1995 |
| JP | 08030697 | | 2/1996 |
| JP | 08129501 | | 5/1996 |
| JP | 09230878 | | 9/1997 |
| JP | 10040462 | | 2/1998 |
| JP | 10097584 | | 4/1998 |
| JP | 10154183 | | 6/1998 |
| JP | 00019351 | | 4/2000 |
| JP | 00043927 | | 7/2000 |
| JP | 00063808 | | 10/2000 |
| JP | 00073952 | | 12/2000 |
| WO | WO0063808 | * | 4/1979 |
| WO | WO00/19351 | | 4/2000 |
| WO | WO00/43927 | | 7/2000 |
| WO | WO00/63808 | | 10/2000 |
| WO | WO00/73952 | | 12/2000 |
| WO | WO01/28261 | | 4/2001 |

OTHER PUBLICATIONS

Computer World—v30/n1/p. 32—Dec. 26, 1995—King, Julia "Agents of Change—Technology Service Firms Poised to Shake Up Hotel Reservation".*

"Extensity Partners With Internet Travel Network"—Newswire, Aug. 3, 1998.*

Computerworld "Agents of Change"—King J, Jan. 2, 1996.*

Hilton Press Releases "Hilton to Develop Central Reservations System", Oct. 27, 1997.*

Datalex—"Book It—Internet Booking Engine", Mar. 12, 1999.*

Business Wire "Marriott Villas Turns to Internet", Oct. 1, 1998.*

Murphy et al; Restaurant maketing on the Worldwide Web; Feb. 1996; Cornell Hotel & Restaurant Administration Quarterly, v37, n1, p. 61(11); dialog copy 13 pages.*

The NetCaddy—Your Online Golf Guide, Dec. 12, 1998; wayback machine archive; 2 pages.*

The NetCaddy—Your Online Golf Guide, Apr. 17, 1999; wayback machine archive; 2 pages.*

"Tee Master Homepage", TeeMaster, Inc.

"Golf's eCommerce Company", EZLinks Gold, Inc.

"CitySearch.com", citysearch.com, http://www.citysearch.com/.

"869 Online Hotels", Italy Hotel Reservation.

"Southwest Airlines Home Gate", Southwest Airlines Co.

"Personalized Reservation Service", Savvy Diner.

"About HRN", Hotel Reservations Network.

"Hawaii Inc. Ex-attorney tees off with online golf reservations-Jun. 15, 1999", SelectTeeTimes.com.

"Restaurant Row Sees Green on Their Plates", OnlinePress.com.

"Take real-time reservations across the internet", WORLDRES promotional package.

"Restaurant Cuts Time to Make Reservations by 75%", Rock Systems Customer Profile, Promotional Brochure.

"Informational Binder, Prepared Exclusively for: Golf Course" SelectTeeTimes.com.

"Microtel Adopts Internet-based res system", Jan. 1998, Cleveland, Lodging Hospitality.

Seal, Kathy "California shelves new logding reservations system", Apr. 6, 1998, Hotel and Motel Management, Duluth.

Bob Violino, "Reservations online", Apr. 27, 1998, Informationweek.

Abstract of Sheehan, M., Mr. Bell gains Canadian namesake (videotex service), Telephone Engineer and Management, Mar. 1, 1990, vol. 94, (No. 5): 36,38.

Abstract of Glen, R., Alex set of charm users (videotex service), Canadian Datasystems, Dec. 1988, vol. 20, (No. 12):67-8.

Abstract of Reed, A. "Amadeus takes to the air (computer reservation system)", Business Solutions, Spring 1990 (No. 4): 23-5.

Abstract of Helm, S. "Travel by computer (online travel information)", DEC Professional, Jul. 1986, vol. 5. (No. 7): 66-70.

Abstract of King et al., "Hotels heading for net without reservations", Computerworld, vol. 29, No. 48 (Nov. 27, 1995): 1 (2 pages).

Abstract of Crockett, Barton, "ISDN service lets travelers book rooms from airport. (Harrah's Reno)", Network World vol. 6, No. 8 (Feb. 27, 1989): 2 (2 pages).

Abstract of Dysart, J., "Interactively: the new standard for a restaurant Web presence", Journal of Restaurant & Foodservice Marketing, 1998, vol. 3 (No. 1): 77-81.

Abstract of Sussman, Ann, "GTE tunes in to home TV shopping", PC Week, vol. 5, No. 26 (Jun. 28, 1988): C15 (1 page).

Abstract of Yakhlef, A., "The Internet as a new locus for value creation", Management Decision, 1998, vol. 36 (No. 9): 610-14.

Russell Shaw, "Roundtable has experts talking about on-line reservation booking", Mar. 2, 1998, Hotel and Motel Management, Duluth.

Ed Rubinstein, "Host Marriott to test Internet surfing boxes at airports", Jun. 20, 1997, Nation's Restaurant News, New York.

"The 'H' in Hilton stands for hi-tech", Nov. 3, 1997, Nation's Restaurant New, New York.

Prewitt, Milford, "New, net-based system promises online reservation short-cuts", Feb. 12, 1996, Nation's Restaurant News.

LeVecchia, Gina, "Guest tracking", Apr. 1998, Restaurant Hospitality, Cleveland.

Van Houten, Ben, "A table for two in cyberspace", Jul. 1, 1998, Restaurant Business, New York.

Grimes, Rob, "Foodservice's success on the Internet seems a virtual reality", Feb. 3, 1997, Nation's Restaurant News, New York.

"Food service and the Web?", Oct. 21, 1996, Nation's Restaurant News, New York and a request to make an on-line reservation at Michael's on East Restaurant as printed from www.bestfood.com/moc/.

Seneff et al., "A new restaurant guide conversational system: issues in rapid prototyping for specialized domains", Spoken Language Systems Group Laboratory for Computer Science, Massachusetts Institute of Technology, Cambridge, MA.

SelectTeeTimes.com Cast Study, p. 1 of 9, Aug. 18, 1999.

"Online Restaurant Reservations Hit the Windy City", Newsbytes News Network, Aug. 25, 1998.

"New, Net-Based System Promises Online Reservation Short-Cuts", Nation's Restaurant News, Feb. 12, 1996.

"Bristol Retail Solutions Subsidiary Launches First Internet Tee-Time Reservations System", PR Newswire, Aug. 11, 1997.

"Pegasus, Microsoft Grow Closer", Lodging Hospitality, Jan. 1999.

"Hotelogue in Internet deal", Travel Trade Gazette UK & Ireland, Nov. 4, 1998.

"Hotel booking system for Abacus", Information Week, Apr. 27, 1998.

"Agents Muster to Fight California's Hotel Res Service", Travel Agent, Dec. 15, 1997.

"Leisureplan & ITN Launch Joint Travel Web Site", Newsbyte News Network, Aug. 12, 1997.

"Hilton Hopes Consumers Will Check Out Check-in", Promo, Sep. 1996.

"Travelling on-line with Resnet", Financial Express, Jun. 8, 1996.

"Independent hotels claim equal time on Web", Hotel & Motel Management, Jun. 17, 1996.

"Choice Offers Direct Link", Information Week, Jun. 26, 1996.

"Hotel Reservations to go online", PR Newswire, Sep. 26, 1995.

"PEGASUS Systems: Travelers can now make reservations for Wyndham Hotels & Resorts through the Internet", M2 Presswire, May 22, 1997.

"Hilton Hotels and SABRE interactive to provide airline and car rental reservations through HiltonNet Web site", Business Wire, Nov. 13, 1996.

"ITT Sheraton Corporation Launches New World Wide Web Site for Global Hotel Reservations and Information", PR Newswire, Nov. 6, 1996.

"Hilton Hotels opens "cyber-resort" for no-risk trial of new online reservations", Business Wire, Jul. 24, 1996.

"Reservations at Hilton hotels now can be booked on the Internet through Pegasus Systems' TravelWeb Site", Business Wire, Jan. 25, 1996.

"ERS Introduces site offering on-line bookings. (Electronic Representation Services, World Wide Web hotel reservation system) (Brief article)" Travel Weekly Oct. 5, 1995.

Online Information Service Online Service Introduction World Wide Web Consortium, Computerworld, Dec. 26, 1995.

Choice Hotels opens its doors on the Internet. (Choice Hotels International World Wide Web pages for Reservations), Computerworld, Jul. 3, 1995.

"GourmetSociety Homepage", Global Booking Services.

* cited by examiner

Join eCuisine and have your reservation available online.....

| | |
|---|---|
| Restaurant Name | |
| Restaurant Owner's Name | |
| Street address | |
| City | |
| State | Select State ▽ |
| Zip Code | |
| Phone | |
| Fax | |
| eMail address | |
| Type of cuisine | Select Cuisine ▽ |
| Please pick a User Name | |
| Please enter your password | |
| Do you have banquet services as well? | ⊙ Yes   ○ No |
| Do you have your own restaurant web site? | ⊙ Yes   ○ No |

Recommend a restaurant

Make sure your favorite restaurant knows you are looking for them at eShock. Just fill out the brief form below and we will follow up to invite them to become a member of the eCuisine community.

| | |
|---|---|
| Restaurant Name | |
| Restaurant owner's Name | |
| Address | |
| City | |
| State | Select State ▽ |
| Zip Code | |
| Phone | |
| Type of cuisine | Select Cuisine ▽ |
| Reasons I like this restaurant | |
| Your Name | |
| | Thank you for your recommendation |
| Your eMail | |

| Restaurant 142a | City | Cuisine | Zagat's Rating 148 | Price | Diner's Comments 150 |
|---|---|---|---|---|---|
| Grandview Restaurant | Burlingame | Chinese | *** | $$$ | Message 1- |
| Hong Kong Flower Lounge | San Francisco | Chinese | *** | $$$ | Message 1- |
| | San Jose | Chinese | *** | $$$ | Message 1- |
| Try Me | San Jose | Chinese | *** | $$$ | Message 1- |
| Try Me | San Jose | Chinese | *** | $$$ | Message 1- |
| Try Me | San Jose | Chinese | *** | $$$ | Message 1- |
| Try Me | San Jose | Chinese | *** | $$$ | Message 1- |
| Try Me | San Jose | Chinese | *** | $$$ | Message 1- |
| Try Me | San Jose | Chinese | *** | $$$ | Message 1- |
| Try Me  142n | San Jose | Chinese | *** | $$$ | Message 1- |
| Try Me | San Jose | Chinese | *** | $$$ | Message 1- |

Search result

New Restaurant Search

Reservation for Grandview restaurant

Please provide the following information so that we can check real-time table availability for you.

| | |
|---|---|
| Date you wish to book your reservation | 4/23/99 ▽ — 192 / 124 |
| How many people in your party? | 4 ▽ — 194 / 124 |
| Smoking? | ● No  ○ Yes    193a |
| Special Dietary Requests? | 193b |
| Special Occasion? | ○ No  ● Yes, please describe: 193c |

Go — 195

190

Cancel a Reservation

| | |
|---|---|
| Party Name | [_____] |
| Date of Reservation | [_____▽] |
| Email Address | [_____] |
| User ID | [_____] |
| Password | [_____] |

You have selected a table for 4 on 4/23/99. Here are the times a reservation is available. ← 202

| Time | Availability |
|---|---|
| Lunch | |
| 11:00 | Available |
| 11:30 | Available |
| 12:00 | Not Available |
| 12:30 | Available |
| 1:00 | |
| Dinner | |
| 5:00 | Available |
| 5:30 | Available |
| 6:00 | Not Available |
| 6:30 | Not Available |
| 7:00 | Not Available |
| 7:30 | Available |
| 8:00 | Available |
| 8:30 | Available |
| 9:00 | Available |
| 9:30 | Available |

FIG. 10

A table for 4 on 4/25/99 is available at 6:30 PM. Do you want to confirm your reservation now?
For eShock members, confirm your reservation now by signing in

222

| Member ID | 226 |
|---|---|
| Password | 228 |

224

GO — 230

If you are not yet an eShock member yet, you need to join to book your reservation. What are you waiting for, it's free!

Membership Sign-up

232

| Select a login name | |
|---|---|
| Choose a Password | (minimum 4 characters) |
| Confirm Password | |
| First name | |
| Last name | |
| Street address | |
| City | |
| State | Select State |
| Zip Code | |
| Phone | |
| eMail address | |
| Do you want to receive emails from eShock on restaurant's promotional? | 234a  234b<br>● Yes  ○ No |

To confirm your table reservation for *4* on *4/23/99* at *6:30 PM*, please enter your credit card number, a $20 no show if you do not show up and a $1 eShock reservation charge will apply to your card. —252

| Credit card number | 242 |
| --- | --- |
| Credit card Type | VISA 244 ▽ —124 |
| Expiration date | Jan ▽ 1999 ▽ —124 |

Your table reservation for *4* on *4/23/99* at *6:30 PM*, is confirmed. Do you want to make another reservation at Grandview? Or return back to eShock homepage?
—262

Restaurant Center

If you're not a participating restaurant in the eCuisine community, sign up now! ← 281

If you are a participating restaurant, log-in now:

| User Name | 284 |
| --- | --- |
| Password | 286 |

APPARATUS AND METHOD FOR AN INTERNET BASED COMPUTER RESERVATION BOOKING SYSTEM

RELATED APPLICATION(S)

This application claims the benefit of priority under 35 USC §119(e) of provisional application No. 60/083,651, filed Apr. 30, 1998 entitled "Apparatus and Method for a Computer Reservation System that is Accessible Over the Internet", hereby incorporated by reference herein.

FIELD OF THE INVENTION

The present invention relates to computer software, and more particularly, to an Internet based computer reservation system.

BACKGROUND OF THE INVENTION

Since the introduction of web browsers by companies such as Netscape Communications, a division of America On-line and Microsoft Corporation, the Internet has seen an explosion of activity. Businesses, both big and small, are creating web sites to obtain wide exposure, to inform the public of their goods and services, and to conduct Internet commerce. Web sites that are in current use by businesses are of varying sophistication.

The least sophisticated type of web site used by merchants are those that simply present information. These web sites typically display information about the merchant's organization, contact information, and goods or services. These web sites are not interactive and do not permit two-way communication. A person accessing the web site therefore can not provide the merchant information necessary for commerce, such as a product selection, name, ID, credit card number, etc., over the Internet. Accordingly, these types of web sites are not conducive for Internet commerce and are of limited value.

More sophisticated web sites useful for conducting business over the Internet generally provide for two-way communication. These web sites typically include web page(s) to display a merchant's goods and/or services for sale, and pages for allowing a person viewing the web site to make a purchase over the Internet. For example, a web site for a bed and breakfast inn may include photographs and information about the inn. A user accessing the web site may make a room reservation at the inn by selecting a room and a date for the reservation using either pull down menus or typing such information into predetermined fields included on the web site. The information is then emailed to the computer maintaining the web site. The problem with this type of web site is that it is typically a "stand-alone" piece of software, not linked or integral to other computer systems or software the merchant may use in the ordinary course of business. The merchant is therefore required to take the reservation information (name, date, party size, rate, etc.) received by email, and manually enter it into the reservation system ordinarily used by the inn. The merchant is then required to confirm the reservation with the customer by either a return email, by facsimile, or by telephone. The customer does not receive a real-time confirmation. This method is therefore inefficient, cumbersome, and prone to error and leaves the Internet user with an "incomplete" web experience.

The most sophisticated web sites used for Internet commerce typically include databases and are highly interactive. These web sites permit users to perform on-line searching, enter queries, make purchases, and access database information over the internet. See for example the web sites for Amazon.com, and United Airlines. The problem with these websites is that they need to be custom created by software experts with a high degree of skill and expertise. These web sites are therefore very expensive and time consuming to create and are well beyond the means of most merchants hoping to conduct business over the Internet.

The vast majority of service oriented businesses that sell an inventory of time-slots (e.g. restaurants, golf courses, bed and breakfast inns, spas, etc.) still use "pencil and paper" systems to keep track of their reservations/appointments. Unlike eCommerce retailers selling goods over the Internet, these merchants have yet to participate in the Internet revolution. An easy to use, flexible, customizable Internet based reservation software package that enables such merchants to capitalize on the Internet revolution is therefore needed.

SUMMARY OF THE INVENTION

The present invention is a software product and system that provides merchants that sell time-slot inventories tools to capitalize on the Internet revolution. The present invention enables the creation of web-sites for merchants with a built-in web-based reservation booking system. This offers customers the on-line benefits of access, selection and immediacy in making real-time reservation/appointments over the Internet. The software product also simplifies the merchant's booking process by providing a central web-based reservation/appointment management system that can be used for all bookings, regardless if made by telephone, by a walk-in customer, or by a customer via the Internet. The software product also provides the merchant with a powerful direct marketing tool. As a merchant uses the software product, user-customer profiles and demographics are captured in the database module, thus creating (in Web jargon) a "community" of customers specific to the merchant. The merchant is thus empowered, using the mail module, to directly communicate with its customer base, using customer profiles and demographics to create a highly targeted and effective marketing and promotion campaign. The software product also allows the merchant to auction off time-slot inventory over the Internet and to offer incentives to repeat customers, again resulting in increased revenue for the merchant. Lastly, the software product enables the creation of Web "super-communities" consisting of the aggregate of all the individual merchant's customer-communities using the software product.

BRIEF DESCRIPTION OF THE DRAWINGS

FIG. 6B is an exemplary web page encouraging a merchant to become a member of a super-community created by the software product of the present invention.

FIG. 6C is an exemplary web page encouraging an Internet user to recommend a merchant to become a member of a super-community created by the software product of the present invention.

FIG. 7 is an exemplary web page showing the results of a search performed using the search web page of FIG. 6A.

FIG. 9B is an exemplary web page for allowing an Internet user to search records of previously made bookings at the merchant's place of business.

FIG. 10 is an exemplary web page that shows the availability of reservations for the Internet user's search criteria for a booking at the merchant's place of business.

FIG. 11 is an exemplary web page that requires the Internet user to submit membership information to confirm a selected available reservation identified in the web page of FIG. 10.

FIG. 12 is an exemplary web page requiring the Internet user to submit credit card information to hold the reservation.

FIG. 13 is an exemplary web page that confirms the booking at the merchant's place of business made by the Internet user.

FIG. 19A is an exemplary web page of a table layout of a restaurant.

DETAILED DESCRIPTION OF THE INVENTION

Figure 1:
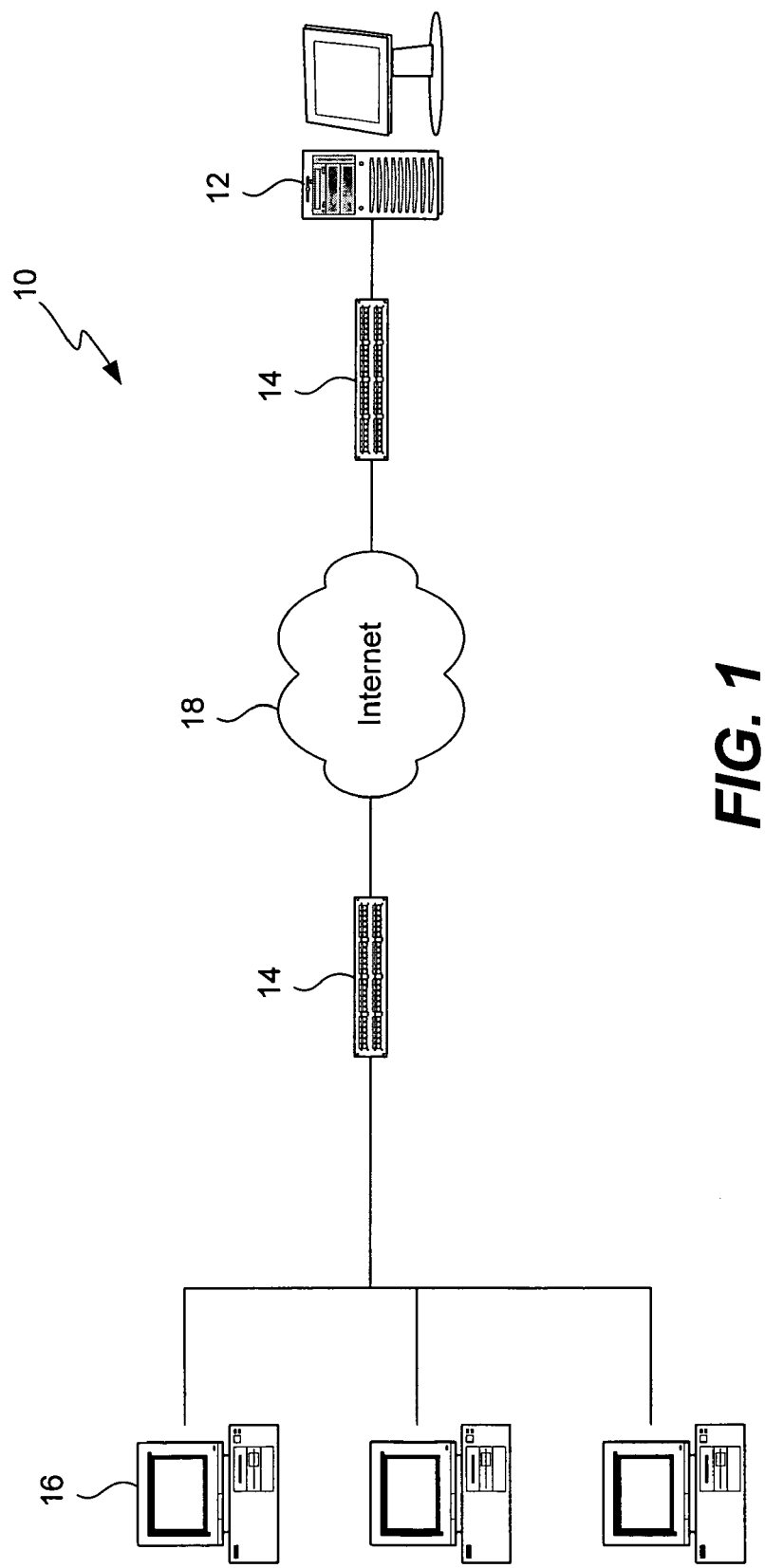
FIG. 1 shows an exemplary computer network in which the software product of the present invention may be implemented.

Referring to FIG. 1, a block diagram of a computer network in which the present invention may be implemented is shown. The network 10 includes a server 12 which executes the software product of the present invention, a plurality of routers 14, and a plurality of computers 16 located at remote locations from server 12. The sever 12 and computers 16 are coupled together via the Internet 18. The sever 12 and computers 16 communicate with one another using standard communication protocols, such as TCP/IP. It should be noted that the network of FIG. 1 is only exemplary, and the server 12 executing the software product of the present invention and the computers 16 may communicate over any type of computer network, including LANs, WANs, wireless networks and corporate intranets, and any type of networking protocol may be used including Ethernet, FDDI, ATM, etc. The server 12 and the computers 16 can be connected to the Internet 18 in any manner, including but not limited to using cable modems, standard modems, wireless modems, DSL lines, T-1 lines, etc. or a combination thereof. The server 12 can be any type of sever, including but not limited to Unix, NT, Linux and Apple OS type servers.

Figure 2:
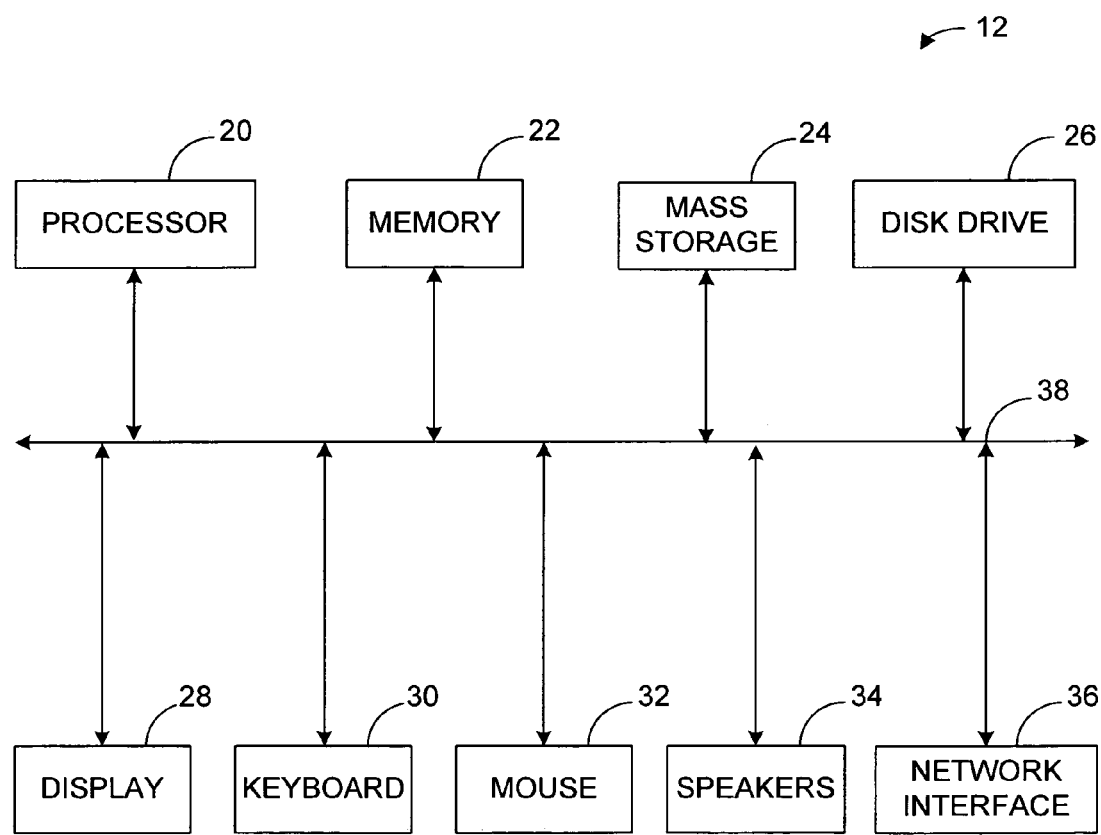
FIG. 2 shows a block diagram of an exemplary computer on which the software product of the present invention may be executed.

Referring to FIG. 2, a block diagram of the server 12 used to execute the software product of the present invention is shown. The server 12 includes a processor 20, memory 22, mass storage 24, a disk drive 26, a standard CRT or flat panel computer display 28, keyboard 30, mouse 32, speakers 34 and a network interface 36. The components 20 through 36 are coupled together and communicate via a system bus 38. The software product of the present invention is loaded into mass storage 24 of the server 12 in a conventional manner. During operation, the software product is transferred into memory 22 and executed by processor 20. Information regarding the software product is presented on the display 28. A user may manipulate and use the software product and enter commands into the server 12 using the keyboard 30 and mouse 32. In alternative embodiments, a touch screen display unit may be used rather than a standard display 28. In such an embodiment, the touch screen would operate as an input device and would be used in replacement of or in complement with other input devices, such as the computer's keyboard 30 and/or mouse 32. The network interface 36 couples the server 12 to the Internet 18 or whatever type of network is used to connect the server 12 with the other computers 16. Accordingly, a remote computer 16 can communicate with the server 12 running the software product of the present invention and vice-versa.

Figure 3:
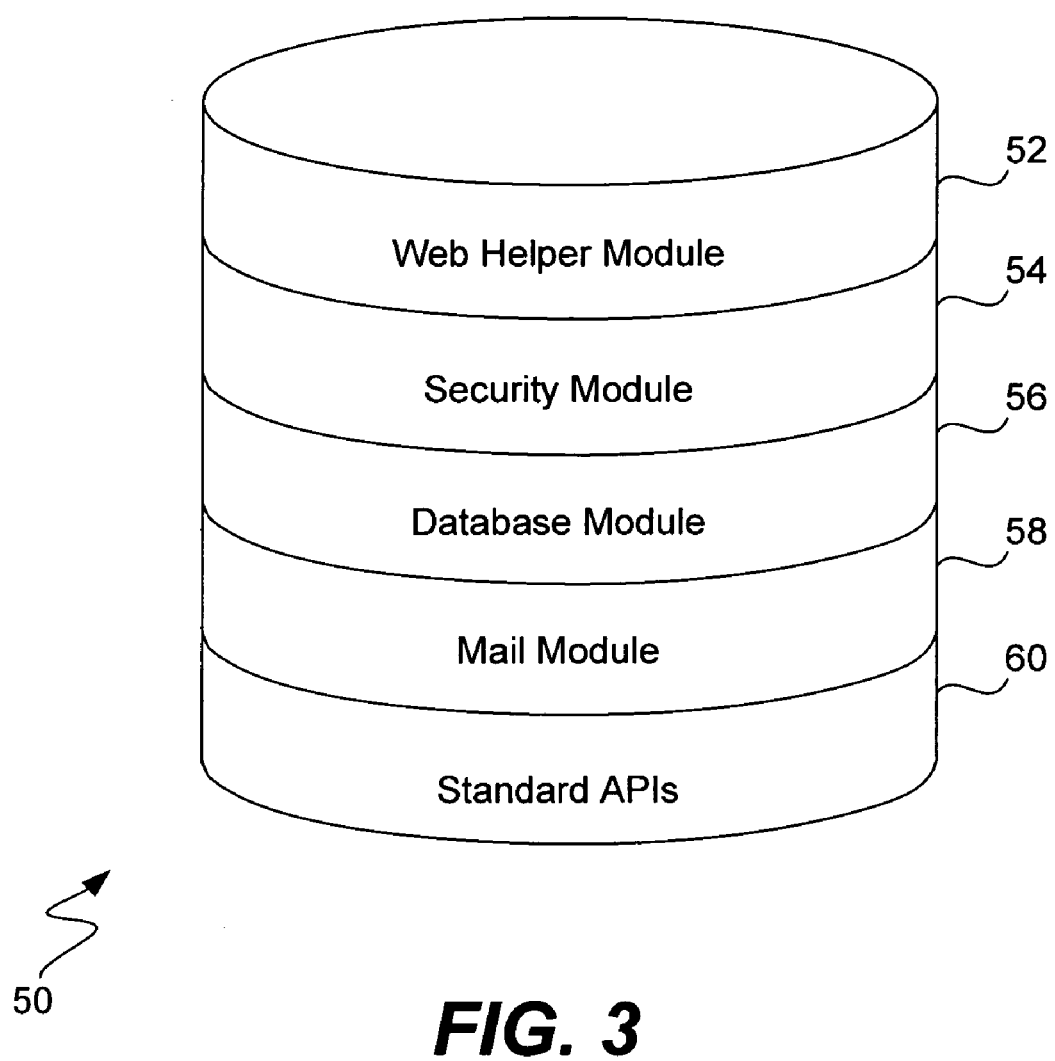
FIG. 3 shows a diagram representing the major modules of the software product of the present invention.

Referring to FIG. 3, a block diagram illustrating the major modules of the software product of the present invention is shown. The software product 50 includes a web helper module 52, a security module 54, a database module 56, a mail module 58 and standard application program interfaces (APIs) 60. Each of these modules is described below.

Web Helper Module 52: This module includes a set of templates and icons that will enable the creation of semi-custom web pages. The templates and icons permit a user to easily create a web site. To create a web site, one or more of the templates included in the module is selected. The selected templates are semi-customized for a target application (e.g., restaurants, golf courses, movie houses, etc.) by selecting and dragging icons from a library of icons to locations on the templates and by entering text and graphics onto the templates. The web helper module 52 also includes other tools that allow the user to create browser-friendly, high-content, interactive, multi-media web sites. For example, the web helper module 52 includes features to include clip-art, photographs, video clips, sound bites, etc. In one embodiment, the web helper module 52 is developed using one or more of the following tools: Front Page Express from Microsoft, Claris Home Page, Adobe GO Live, Adobe Photo Shop, Adobe Image Ready, Microsoft Development Studio. These tools enable the creation of dynamic hypertext web pages that are semi-customized for merchants in a selected vertical market.

Security Module 54: The software module 54 provides for two types of security, including encryption to protect information sent over the Internet 18, such as user names, credit card numbers, phone numbers, and other personal or confidential information. The security module also includes protection to prevent information in the database module 56 from being stolen or corrupted by persons accessing the server 12 over the Internet 18. Any one of a number of known security techniques may be used. In alternative embodiments, the built-in encryption and password protection features standard on most commercially available servers can be used to prevent unauthorized access to the server 12 and database module 56. A Security Socket Layer (SSL) as offered by many credit card vendors (MasterCard, Visa, etc.) can be used to protect Internet transactions involving sensitive Internet user information, such as credit card numbers, etc.

The Database Module 56: The database module 56 includes a relational database and search engine. The records, fields, search queries and other features of the database can be fully customizable for any application or semi-customized for a specific application. In alternative embodiments, the database module can be created using Microsoft's Active Server Page technology, SQL server technology, Database Artisan Software, or database products from Oracle Corporation, Redwood Shores, Calif. for example. The details of the database 56 hierarchy and structure are described in greater detail below with regard to FIG. 25.

The Mail Module 58: The mail module 58 includes a feature that enables emails to be sent to selected users from the server 12. The emails can be manually sent by a person operating the server 12, they can be automatically generated by the server 12, or they can be generated remotely from a computer 16 and then sent to other computers 16 by the server 12. The email module may be configured to automatically query the database module 56 and send email messages to parties entered into the database module. For example, the mail module may generate emails to selected parties as a reminder of a reservation, or to send messages to customers, or to send advertisements to customers.

Standard APIs 60: The software product 50 includes standard APIs 60, so data and other information can be exchanged with other software systems.

The software product 50 creates and provides a number of compelling advantages for a merchant selling time-slot inventory and seeking to conduct business over the Internet. It enables the creation of web-sites for merchants with a built-in web-based reservation booking system. This offers customers the on-line benefits of access, selection and immediacy in making real-time reservation/appointments (hereafter generically referred to as "bookings") over the Internet. The software product 50 also simplifies the merchant's booking process by providing a central web-based reservation/appointment management system that can be used for all bookings, regardless if made by telephone, by a walk-in customer, or by a customer via the Internet 18. The software product 50 also provides the merchant with a powerful direct marketing tool. As a merchant uses the software product 50, user-customer profiles and demographics are captured in the database module 56, thus creating (in Web jargon) a "community" of customers specific to the merchant. The merchant is thus empowered, using the mail module 58, to directly communicate with its customer base, using customer profiles and demographics to create a highly targeted and effective marketing and promotional ad campaign. The software product 50 also allows a merchant to auction off time-slot inventory and to run Internet-based promotional incentives to generate repeat business with customers. Lastly, the software product 50 enables the creation of Web "super-communities" consisting of the aggregate of all the individual merchant's customer-communities using the software product 50. All of these features, beginning with the super-communities, are described in detail below.

Super Communities

Figure 4:
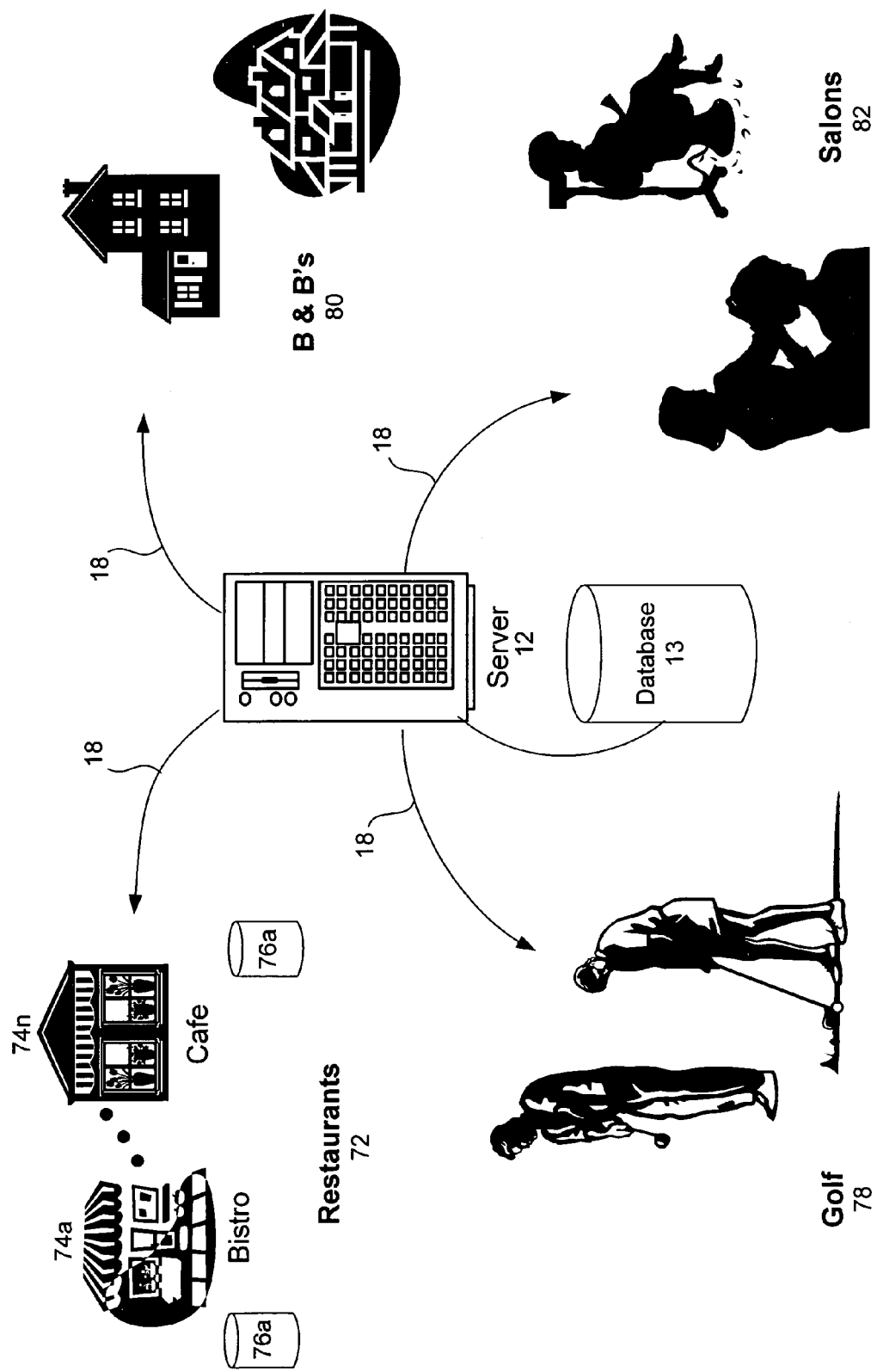
FIG. 4 shows several exemplary "super-communities" created by using the software product of the present invention.

Referring to FIG. 4, a block diagram illustrating several Web super communities is shown. The diagram illustrates a server 12 linked to each of four super-communities via the Internet 18. The first super-community 72, generally aligned along a food service vertical market, includes a plurality of restaurants 74a–74n including but not limited to diners, bistros, cafes, etc. Each restaurant merchant 74a–74n has associated therewith a database 76a–76n for storing booking information and customer information (a community of customers) associated with the merchant. Similarly, the diagram shows other super-communities 78, 80 and 82 generally aligned along the golf, bed and breakfast, and salon industries respectively. Although not shown for the sake of simplicity, each of the merchants in the super-communities 78, 80 and 82 also have an associated database respectively. The databases for all of the merchants collectively form a large database 13 of merchants and respective customers. It should be noted that any merchant in an industry where bookings by customers are generally made in advance may use the present invention. The invention in no way should be limited to applicability to only these exemplary vertical markets.

Figure 5A:
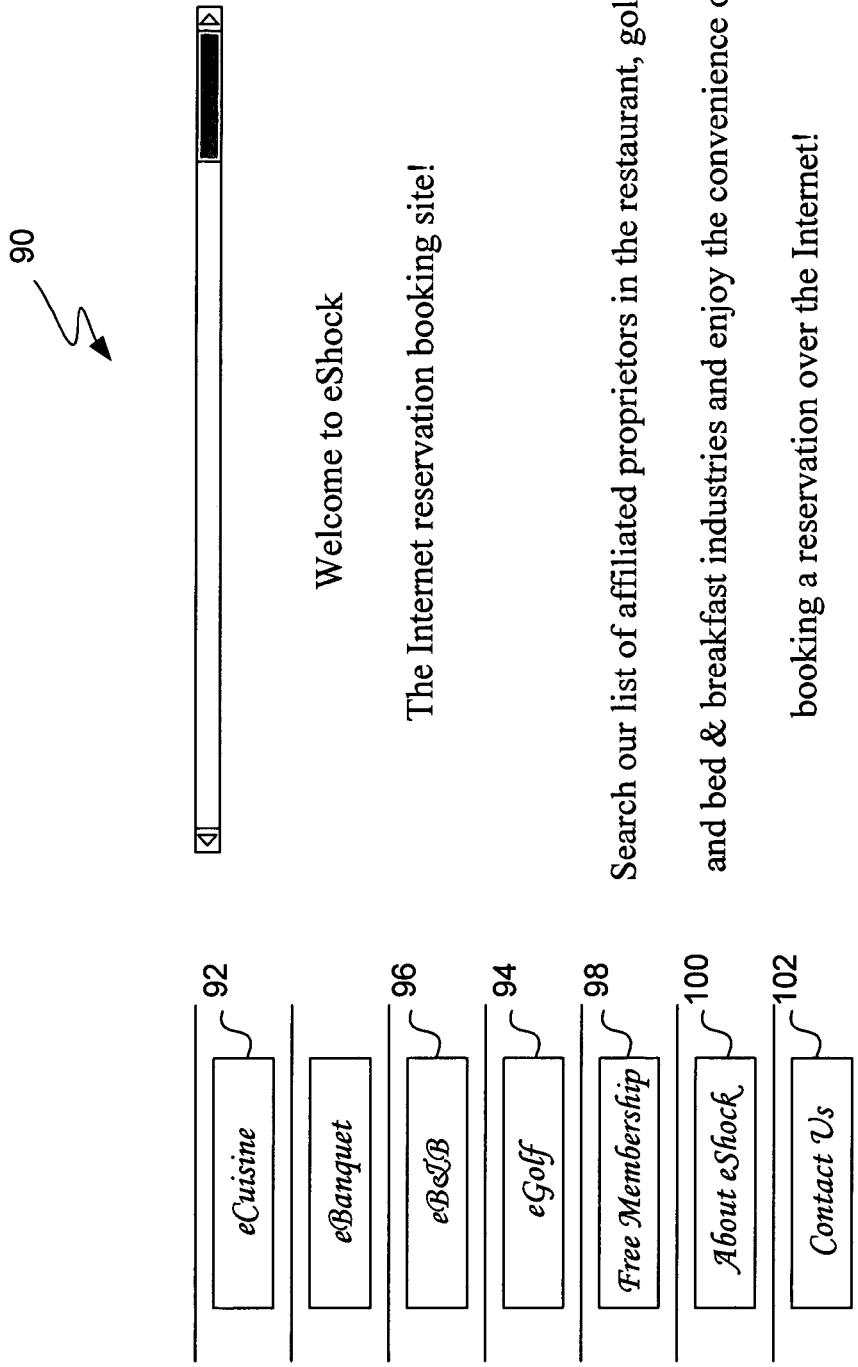
FIG. 5A shows an exemplary web home page for accessing the software product of the present invention over a network.
Figure 5B:
FIG. 5B shows an exemplary membership sigh-up web page for users to become a member of a community created by the software product of the present invention.

Referring to FIG. 5A, a proposed web home page for accessing each of the super-communities 72–82 is shown. The web home page 90, which in one embodiment is hosted by the server 12, includes a brief written description of the web site hose (in this example, the name of the host is eShock Corporation), a hot link 92 labeled "eCuisine" which provides a link to the restaurant super-community 72, a hot link 94 labeled "eGolf" which provides a link to a golf super-community 78, a hot link 96 labeled "B&B" which provides a link to the bed and breakfast super-community 80. In addition, the web home page 90 also provides a link 98 to a web page that allows Internet users to become a member of one or more of the super-communities, link 100 that connects to the home web page of the organization hosting the home page 90 (e.g., eShock) and a link 102 which allows an Internet user a contract the host company via email. For an exemplary membership sign-up form which appears when link 98 is selected, see FIG. 5B.

By way of example, the Applicants describe the present invention as it pertains to the restaurant industry. This description, however, should in no way be considered as limiting and the principles and features of the present invention could readily be used, with obvious modifications, for any industry where advanced bookings by customers is commonplace, including but not limited to the golf, bed and breakfast, salon, spa, cinema, sports, performing arts, medical industries, etc.

Internet Bookings

Figure 6A:
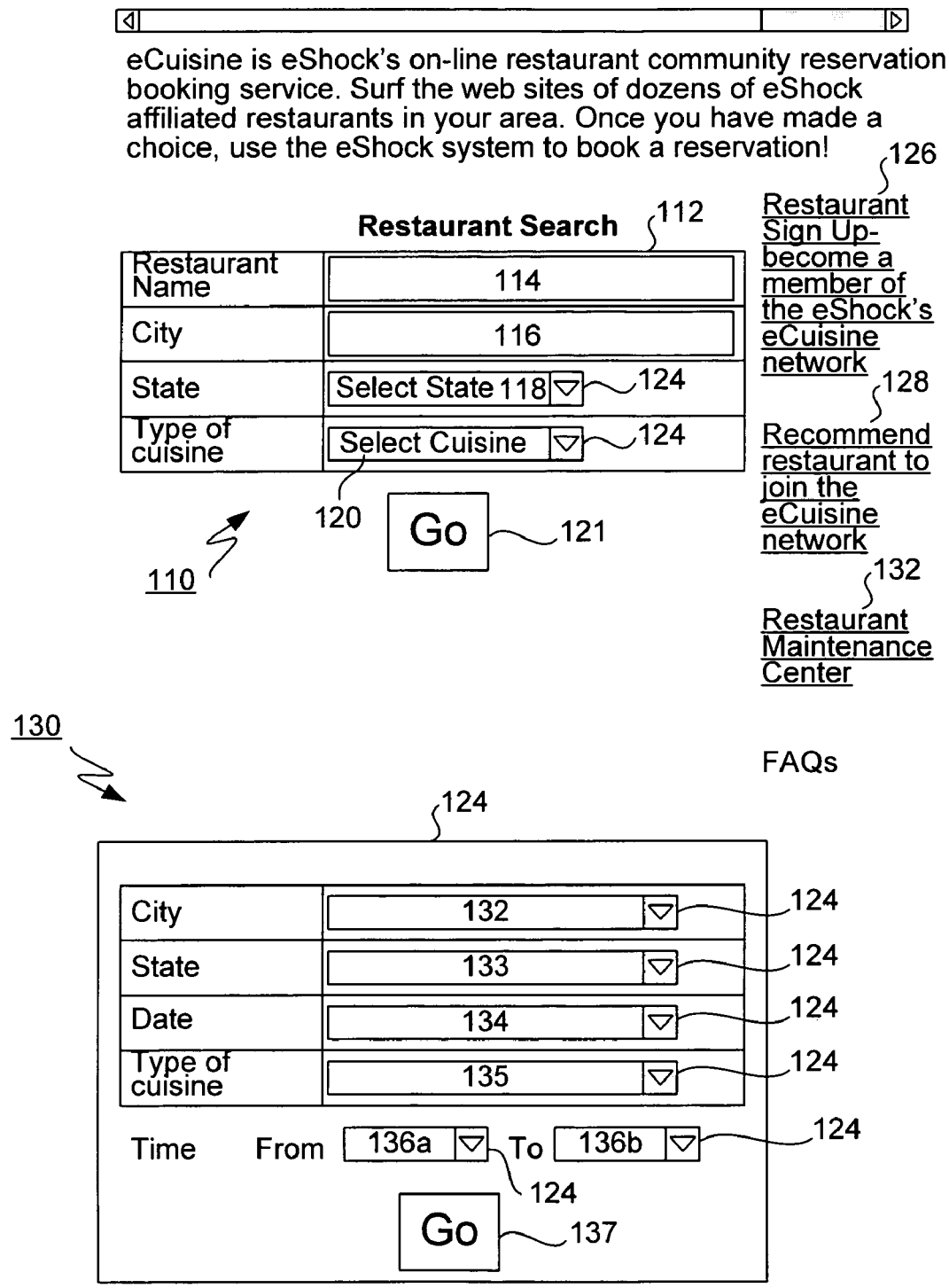
FIG. 6A is an exemplary web page used for searching for a merchant using the software product of the present invention.

Referring to FIG. 6A, an exemplary web home page 110 for the restaurant super-community 72 is shown. The web page 110 appears when an Internet user selects the eCuisine hot link 92 of FIG. 5. The web page 110 includes a search window 112 which allows an Internet user to search and find a restaurant(s) by name (data entry field 114), by city (data entry field 116), by state (data entry field 118) and/or by type of cuisine (data entry field 120). In an alternative embodiment, one or more of the entry fields 114–120 can be replaced by or used in complement with a pull-down type menu as denoted by arrows 124. The data entry fields 114–120 and the pull-down menus 124 of search window 112 provide an Internet user with a tool to search and find one or more restaurants affiliated with the restaurant super-community 72. Entry 114 allows an Internet user to search for a specific restaurant by name. Entries 116, 118 and 120 allow a user to perform a broader search by city, state and type of cuisine respectively. The search request is submitted by selecting the "GO" icon 121.

The web page 110 of FIG. 6A includes a second data entry window 130 which allows an Internet user to search and find multiple available reservations at different restaurants 76 affiliated with the super-community 72 and meeting the user's search criteria. The window 130 includes data entry fields to enter a city name (132), state (133), date (134), the type of cuisine (135) and a requested time range (136a and 136b). By completing one or more of the data entry fields (132–136), the user can craft a specific search meeting his or her needs. For example, if the searcher is interested in finding available reservations at Italian restaurants in San Francisco between 6:00 PM and 8:00 PM on Friday, Apr. 30, 1999, the user is required to fill in the fields (132–136) and to submit the request by selecting the "GO" icon 137. This will cause the software product 50 to check the database 76 of the affiliated Italian restaurants in San Francisco at the requested date and time for availability. The hot links (not shown) to the restaurants meeting the search criteria will then be displayed. The user can then peruse the web sites of these restaurants and make a reservation at a selected restaurant over the Internet as described below.

The restaurant home page 110 also includes a link 126, labeled "Restaurant Sign-Up" which provides a link to a page that allows a restaurant to become a member of the restaurant super-community 72. See FIG. 6B for an exemplary restaurant sign-up page. The restaurant home page 110 also includes a link 128, labeled "Recommend a Restaurant". Link 128 provides a link to a page that enables an Internet user to recommend a new restaurant to the host of the restaurant super-community 72. See for example FIG. 6C. The web page 110 provides a link 130 labeled "FAQs" which provides useful information about the restaurant super-community 72 and a link 132 labeled "Restaurant Maintenance Center" which will be described in greater detail below.

The restaurant sign up web page (FIG. 6B) provides a restaurant with an easy, inexpensive and quick way to become an affiliated merchant 76 in the restaurant super-community 72. By submitting all of the appropriate information, the host of the server 12 can create the database 76 for the merchant on the server 12. In addition, the host can create a web site for the merchant using the web helper module 52 of the software product 50. Using the web page templates, the host can quickly create a web site for the merchant. All the merchant is required to do is provide the host with the relevant information, such as a menu, specials, wine list, reviews, etc. along with photos and/or other graphics pertinent to the merchant. This information is then "plugged-in" to the templates created for the merchant's vertical market (e.g. restaurants) and the merchant will have a semi-customized web site interfaced with the on-line reservation system described in this application. Similarly, an existing web site can be updated in an identical manner, thus providing an easy way for the merchant to maintain an up-to-date web site. In alternative embodiments where the merchant already has a web site, that web site can be "seamlessly" integrated with the software product 50 of the present invention by providing the appropriate links between the merchant's web site and the software product 50 maintained on the server 12.

Referring to FIG. 7, the results for an exemplary search request using search window 112 or 130 is shown. In this example, the search results 140 were obtained by a user entering "California" into data entry field 118 and a "select all" choice for the "Select Cuisine" data entry field 120 using a pull-down menu 124. As is illustrated in FIG. 7, the search results provides a first column that includes hot links 142a–142n to the home page of each restaurant meeting the search criteria and affiliated with the restaurant super-community 72, the second column provides the street address of each restaurant, the third column provides the type of cuisine, the fourth column provides a link 148 to a brief description of the restaurant as published by a restaurant rating organization, such as Zagat's or AAA, the fifth column provides one or more dollar signs denoting the price range of the restaurant and the sixth column provides links 150 to an Internet "bulletin board" where the Internet user can review comments made by previous diners or enter their own comments regarding one of the restaurants.

The search results 140 provides a wealth of pertinent information that the Internet user can access at a glance or by selecting any of the hot links 142, 148 and 150. Not only can the user learn of the type of cuisine or the relative cost of an establishment, they can learn what other patrons think of the restaurant. For example, by selecting a hot link 150 associated with one of the listed restaurants 142, a user can review recommendations from other patrons that have dined at the establishment. As a proprietor of a restaurant will understand, word of mouth recommendations are generally the best form of advertising. The hot link 150 thus provides an Internet forum where users can voice their recommendations to a vast audience of Internet users. This aspect of the software product 50 may therefore be extremely beneficial to a merchant participating in the restaurant super-community 72 because it helps "spread the word" that a particular restaurant is worthy of an Internet user's patronage.

Figure 8:
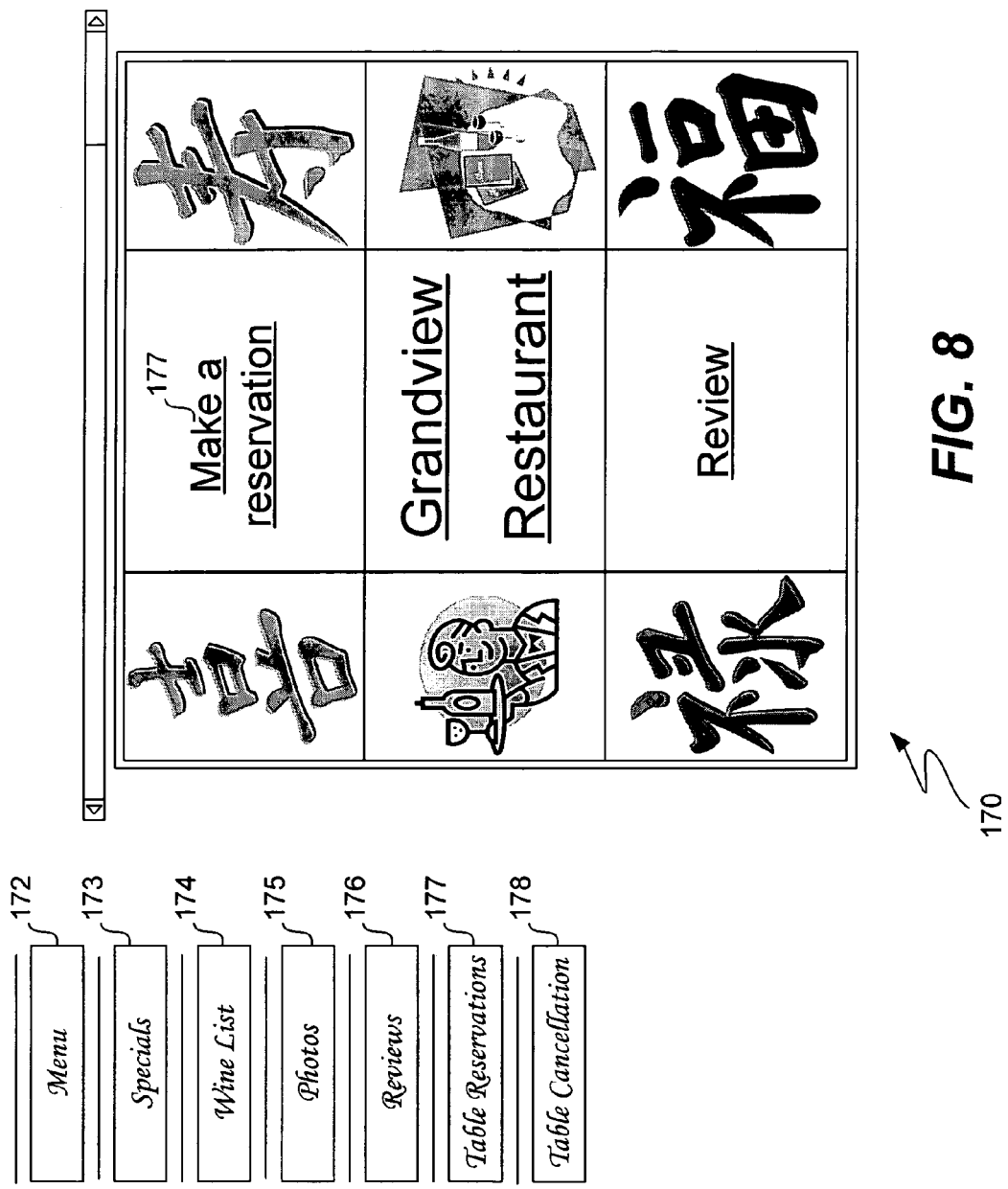
FIG. 8 is an exemplary web home page of a merchant located by the search results found in the exemplary search of FIG. 7.

Referring to FIG. 8, the web home page of the "Grandview Restaurant" as listed in the search results 140 is illustrated. This web page 170 appears when the Internet user selects the icon 142*a* that corresponds to Grandview. The web page 170 includes a hot link 172 to view the menu of the restaurant, a hot link 173 to view the specials, a hot link 174 to view the wine list, a hot link 175 to view photos of the restaurant, and a hot link 176 to view any published reviews about the restaurant. Although not illustrated and discussed for the sake of brevity, the menu link 172, the specials link 173, the wine list link 174, the photo link 175 and the link 176 to any reviews can be very informative to the Internet user. It provides a restaurateur with the ability to entice customers, by posting menu offerings, specials, wines, etc. and photos of the establishment on the Internet, thus providing exposure of the restaurant to potentially millions of Internet users. The link 176 is also very useful because it allows the restaurateur to post any reviews, for example in a culinary magazine such as Food and Wine or Gourmet as well as reviews in local newspapers, etc. on the Internet. An Internet user viewing the web site thus has the ability to review a wealth of information regarding the establishment before making a decision to dine at the restaurant.

Figure 9A:
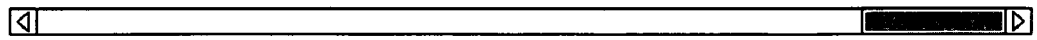
FIG. 9A is an exemplary web page for allowing an Internet user to define the criteria for making a reservation booking at the merchant's place of business.

The web page 170 also includes hot links 177 which enables in Internet user to make a reservation at the Grandview Restaurant over the Internet. Referring to FIG. 9A, a web page 190 for making a reservation is shown. When the Internet user selects the reservation link 177, the web page 190 appears. The web page 190 provides the user with an interface which requires the user to enter the date of the requested reservation into window 192 and the size of the party in window 194. In an alternative embodiment, this information could be entered into the two windows 192 and 194 using a pull-down menu feature 124. The web page 190 also includes data entry fields for smoking/non-smoking 193*a*, for entering any special dietary requests 193*b*, or for informing the restaurant that the Internet user is required to select the GO icon 195 to submit the request. In an alternative embodiment, the user could select the date by choosing a day from a graphical representation of a calendar.

The web page 170 of FIG. 8 also includes a link 178 that enables a user to cancel a reservation made over the Internet. Referring to FIG. 9B, a web page 196 is shown. Web page 196 appears when a user selects the "Cancel a Reservation" hot link 178 of FIG. 8. The web page 196 includes a data entry window 197 that includes date entry fields for the party name, date of reservation, email address, user ID and password. By entering the appropriate date into one or more of these fields and selecting the "GO" icon 198, the user can perform a search for all the future reservations containing matching user information in the merchants database 78. The search results are then displayed to the user along with a "Cancel" icon (not shown) for each found record. Be selecting the cancel icon, the corresponding reservation record is removed from the database, effectuating the cancellation of the reservation.

Referring to FIG. 10, a web page 200 indicating the availability of a table for the specified party size and date is shown. The web page 200 appears when the user enters and submits the date, party size, etc. in the data entry fields of FIG. 9. The web page 200 includes a brief text message 202 which reminds the user of the selected table size and date of the requested reservation. A chart 204 includes a first column 206 that provides a list of all the time-slots at the restaurant for tables of the appropriate size. In the embodiment shown, the time-slots are shown in half-hour increments. This amount of time is arbitrary and any time increment could be used. A second column of hot links 208 indicates if a given time-slot is either "Available" or "Not Available". To make a reservation, the user simply selects a hot link 208 labeled "Available" corresponding to a desired time, which causes the next web page to appear. When no tables of the requested size are available for a given time-slot 206, then the corresponding hot link 208 is set to "Not Available" and is deactivated. In other words, if a restaurant has a total of six tables with a seating capacity of four persons, a given time-slot will be labeled "Not Available" only after the sixth table is booked. Consequently an Internet user cannot reserve this time-slot since all the tables are booked.

Referring to FIG. 11, a web page 220 requesting information of the Internet user to reserve an available time-slot is shown. This web page 220 appears after the user selects a hot link 208 corresponding to an available time-slot as described above. The web page 220 includes a brief text message 222 indicating that a table for the requested party size and date has been found. The reservation can be made in one of two ways, depending if the Internet user is a member of the super-community 72. For user-members, the web page 220 includes a first window 224 which requires the member to enter their member ID in a data entry field 226 and a user password in data entry field 228. The member can confirm the reservation by selecting the "Logon" icon 230 once the fields 226 and 228 are completed. The web page 220 also includes a second window 232 that permits a non-member Internet user to join the restaurant super-community 72 and to confirm a reservation. The window 232 has a number of data entry fields including one for selecting a login name, choosing a password, confirming a password, first name, last name, street address, city, state, zip code, phone, email address and select buttons 234*a* and 234*b* for allowing the user to indicate if they wish to receive promotional emails. In accordance with other embodiments, the window can be customized to request any other demographics or user information, such as a user's interests, income, etc. Once a new member has filled in the data entry fields in window 232, the new member can confirm the reservation by selecting the "GO" icon 236.

Referring to FIG. 12, a web page 240 requesting a user's credit card information to reserve the requested table is provided. This web page 240 appears to the user after the previous web page 220 has been completed and either the "GO" icons 230 or 236 have been selected. The web page 240 requires the user to enter their credit card number into data entry field 242, the type of credit card into data entry field 244 and the card expiration date in data entry field 248. This information is then submitted using the "GO" icon 250. In optional embodiments of the invention, the Internet user may be informed that their credit card will be charged with a transaction fee and/or a no-show fee as provided in the text message 252.

Referring to FIG. 13, a web page 260 which includes a brief text message 262 indicating that the requested reservation has been confirmed at the requested date. When the "GO" icon 250 of FIG. 12 is selected, the user information is written into a record corresponding to the selected time-slot in the database 76 affiliated with the merchant. When the reservation is made, the mail module 58 generates and emails the message 262 to the user, thus providing a real-time confirmation of the reservation.

The aforementioned description of the software product 50 provides Internet users with a number of benefits. It empowers Internet users to easily search and find merchants in a selected vertical market and it provides such users with 24/7 access to making reservations, not just when the merchant is open. It provides users with a wealth of on-line information about each merchant participating in the super-community. It also provides immediacy in allowing users to see both the available and not available time-slots at a glance and immediate "delivery" in the form of an instantaneous confirmation of a reservation. Since the process is automated, it also eliminates many of the "hassles" of making reservations, such as calling a restaurant and being placed on hold, lost reservations, etc.

Merchant Maintenance

The software product 50 also provides numerous benefits to merchants participating in the super-community. The software product 50 naturally creates a community of the merchants' Internet user-customers, allowing the merchant to simply and cost-effectively increase revenues by: (i) increasing its customer traffic through email-based direct marketing to a community of Internet user-customers; (ii) providing a wide-reaching electronic forum for customers to receive information about the merchant and "word-of-mouth" endorsements via the community of participating Internet user-customers; and (iii) gain wide exposure and attract new customers through the super-community which attracts a large number of Internet users having an interest aligned with the vertical market of the merchant. In addition, the software product 50 automates and simplifies the merchant's bookkeeping and reservation/appointment tracking system and provides valuable traffic statistics and user demographics that can be used by the merchant to optimize business results. These features and advantages of the software product 50 are described in detail below with regard to the restaurant super-community 72. Of course these same features and advantages are also available to merchants in the aforementioned other vertical communities.

Returning again to FIG. 6A, hot link 132 labeled "Restaurant Maintenance Center" is provided on the web page 110 for merchants participating in the restaurant super-community 72. This link provides individual merchants with access to their specific booking information, direct marketing tools, and tools permitting the merchant to update their web site, for example as provided in FIG. 8.

Figure 14:
FIG. 14 is an exemplary web page that allows a merchant participating in a super-community created by the software product of the present invention to access information specific to that merchant.

Referring to FIG. 14, a web page 280 entitled "Restaurant Center" is shown. The web page 280 appears when the hot link 132 of web page 110 is selected. The web page 280 includes a text message 281 inviting a non-member restaurant to join the super-community 72 and for participating restaurants to log-in using window 282. Window 282 includes data entry fields 284 and 286 which requires the merchant to enter their unique user name and password respectively, which were defined by the user when they became an affiliated member of the super-community (See FIG. 6B). The merchant is then required to select the "GO" icon 288 to access the information specific to their establishment. Since only the merchant has their unique user name and password, no other party can gain access to the merchant's web site, customer database and booking information contained in the merchant's database 76.

Figure 15:
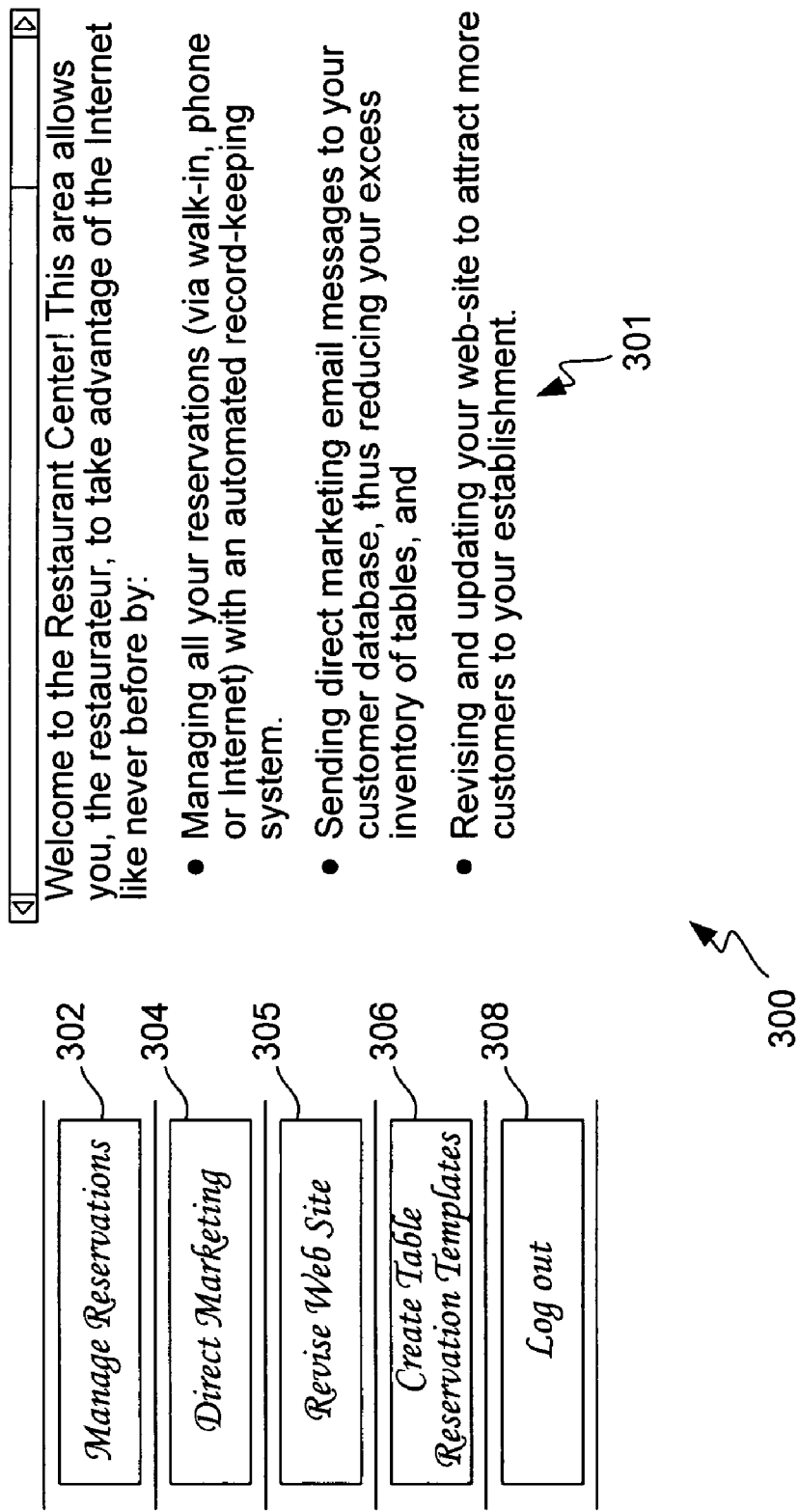
FIG. 15 is an exemplary web page that provides a merchant with several features performed by the software product of the present invention.

Referring to FIG. 15, a web page 300 is shown. Web page 300 appears after a merchant who is a member of the super-community 72 enters their correct user name and password on web page 280. Web page 300 includes a text message 301 that informs the merchant that they can manage their table bookings, perform direct marketing to their Internet customer base, and that they can revise their web site. To perform these functions, hot link 302 entitled "Reservation Manager", hot link 304 entitled "Direct Marketing", hot link 305 entitled "Revise Web Site", hot link 306 entitled "Create Table Reservation Template", and hot link 308 entitled "Log Out" are respectively provided. The "log out" hot link 308 will return the merchant to the Restaurant Search page 110 when selected.

Figure 16:
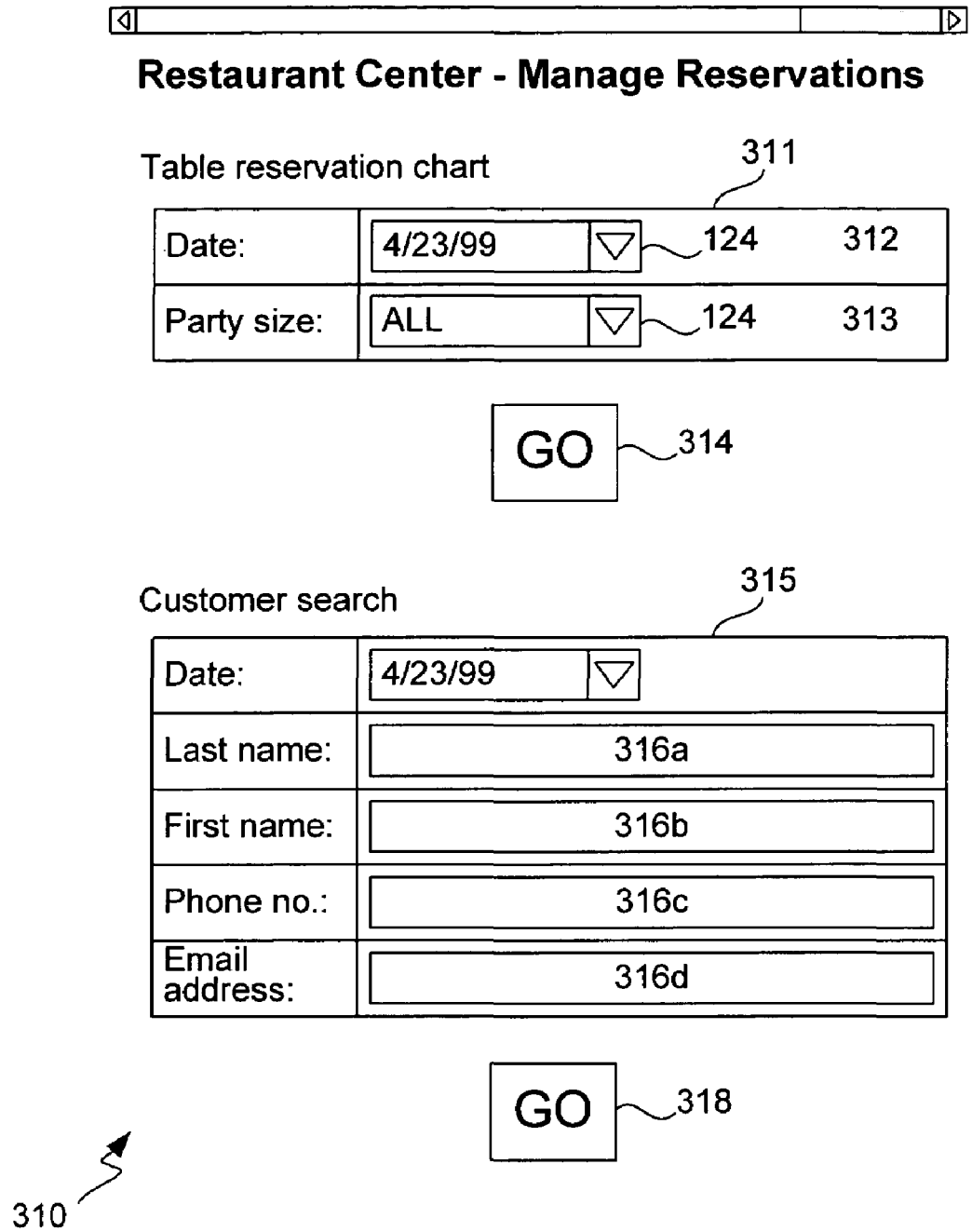
FIG. 16 is an exemplary web page that provides a merchant access to the bookings at the merchant's place of business for a selected day and allows the merchant to find a reservation for a specific customer.

Referring to FIG. 16, a web page 310 is shown. The web page 310 appears when the merchant selects the Reservation Manager hot link 302. The web page 310 includes a window 311 that includes a select date entry field 312 and a select party size data entry field 313. In alternative embodiments, the data to be inserted into fields 312 and 313 using pull down type menu arrows 124. To view all the bookings at the restaurant or to make a new reservation on a given day, the merchant is required to enter the desired date into field 312 and then select the "GO" icon 314. By entering a specific size (e.g., "2"), only tables for two will be displayed when the request is submitted. The web page 310 also includes a Customer Search window 315. This window includes data entry fields for a customer's last name (316*a*), first name (316*b*), phone number (316*c*) and email address (316*d*). By entering the relevant information into one or more of the data entry fields 316(*a*–*d*), the merchant can perform a search inquiry to locate a previously made reservation made by the customer when the "GO" icon 318 is selected. This is accomplished by searching the database 76 affiliated with the merchant for a matching record. When the record is found, the corresponding reservation time-slot (as described below) is highlighted.

Figure 17:
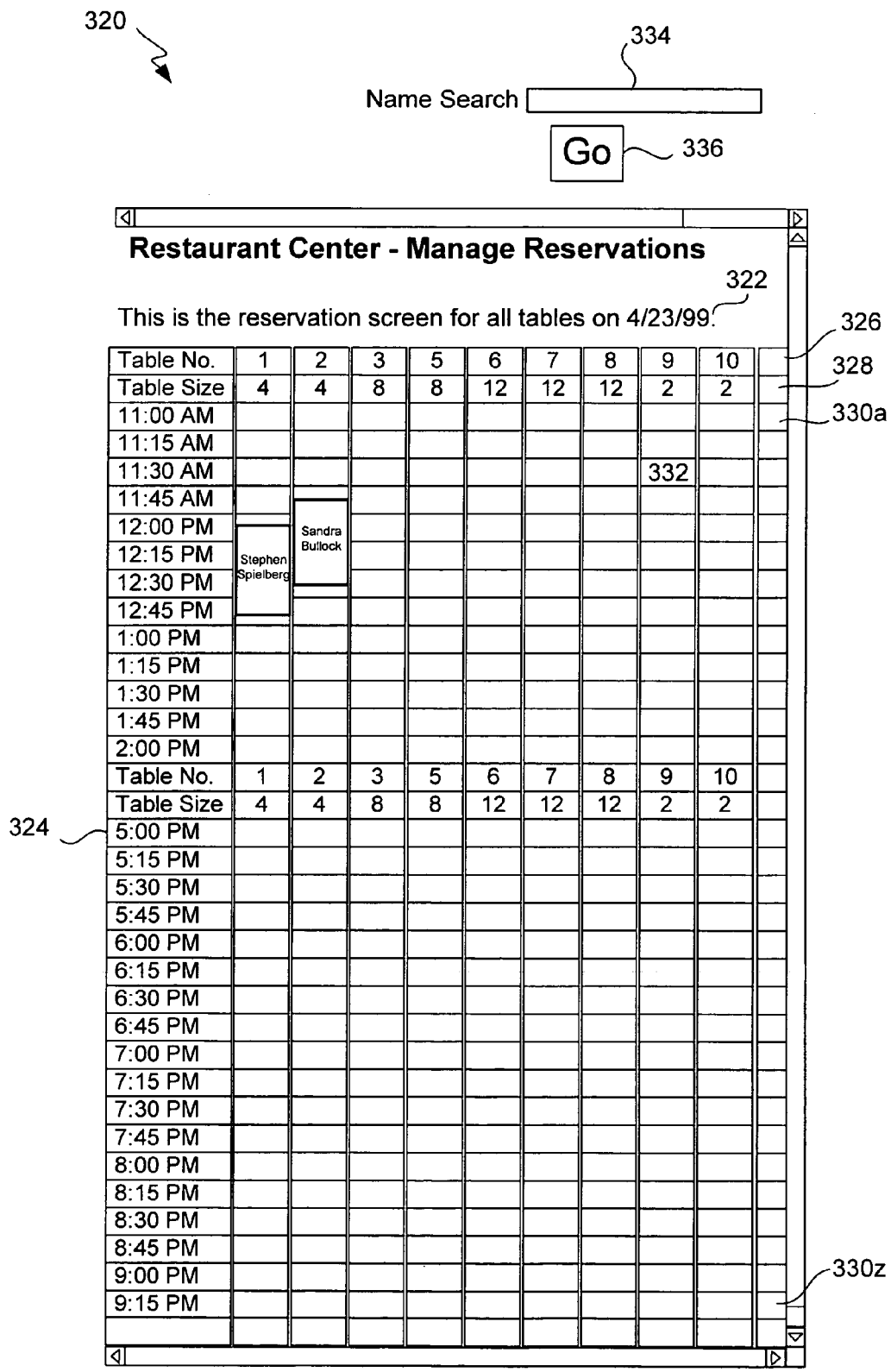
FIG. 17 is an exemplary web page that displays the merchants reservation bookings for a selected day.

Referring to FIG. 17, a web page 320 is shown. The web page 320 appears when the merchant selects either the "GO" icons 314 or 318 of a web page 310. The web page 320 includes a text message 322 that indicates the selected date and a spreadsheet 324. The spreadsheet 324 includes a first row 326 which identifies the table numbers for all or some of the tables in the restaurant, a second row 328 indicates the table size of each listed table, and the remaining rows 330*a*–330*z* designate time-slots 332. For each row 330, a time-slot 332 is provided for each table listed in row 326. In the embodiment shown in FIG. 17, the time-slots are spaced apart in fifteen minute increments for both the lunch hours (11 AM–2 PM) and dinner hours (5 PM–9:15 PM). In alternative embodiments, the time-slots can be selectively incremented by any timing interval and the lunch and dinner hours can be defined by any time periods respectively, depending on the merchant's requirements. When a Party has made a reservation, the Party's name will be entered into the reserved time-slot 332 and is highlighted on the spreadsheet 324. This feature allows the merchant to quickly locate the Party's reservation. By way of example, the spreadsheet shows that Stephen Spielberg has a table for 2 reserved at 12 PM on Apr. 23, 1999 and that Sandra Bullock has a table for 2 reserved at 11:45 AM on this same date. The time-slots 332 for tables that do not have a name entered therein are available for reservation. The web page 320 also includes a data entry field 334 which allows a merchant to type in a Party's name. When the "GO" icon 336 is selected, the time-slot 332 reserved in the Party's name is highlighted. This feature thus provides a quick search tool to find a reservation on the spreadsheet 324.

The software product 50 accommodates all the possible ways a customer can make a reservation at the merchant's establishment. As previously described, the software product 50 enables an Internet user to make a reservation at the merchant's place of business over the Internet. When such a reservation is made, the selected time-slot 332 in the spreadsheet 324 is automatically updated with the customer's name to reserve that time-slot. When an Internet user makes a reservation for a table on a particular day and at a selected time, the user information is written to records associated with the time-slot in the database 76 affiliated with the merchant. The Internet user's name thus appears in the time-slot 332 in the spreadsheet 324 for the day of the reservation. In addition, the software product 50 also allows the merchant to enter reservations into the spreadsheet 324 to accommodate customers making reservations in more traditional ways, such as by telephone or by walking into the establishment. For example, when a customer calls looking for a reservation, the merchant will navigate the various web pages of the software product to get to the web page 320 which displays the reservation spreadsheet 324 for the date the reservation is desired. Then once the customer has decided to accept a reservation at an available time-slot 332, the merchant selects that desired time-slot 332.

Figure 18:
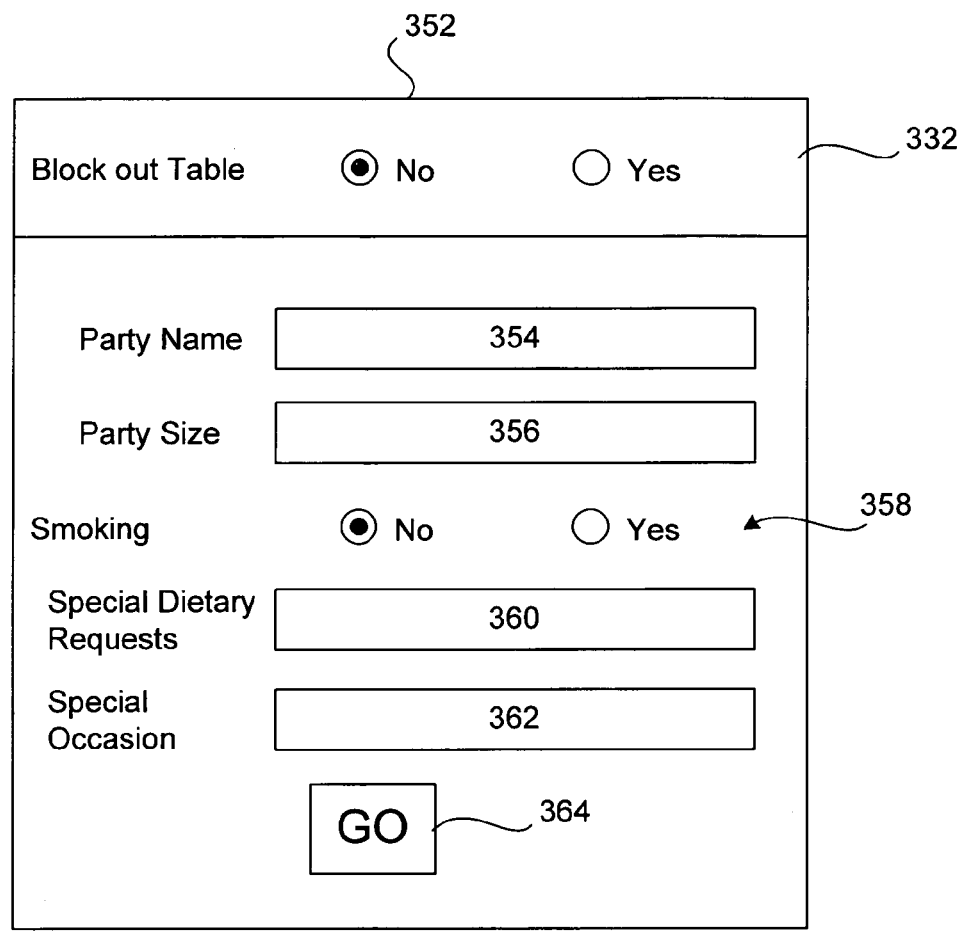
FIG. 18 is an exemplary web page that allows a merchant to enter a booking into the reservation booking display of FIG. 17.

Referring to FIG. 18, a web page 350 is shown. The web page 350 appears when one of the available time-slots 332 of the spreadsheet 324 is selected, for example when the merchant is making a reservation for a customer calling on the phone. The web page 350 includes a window 352 which includes data entry fields for entering a party's name (354), the size of the party (356), whether a smoking or a non-smoking table is requested (358), a field for entering special dietary requests (360) and whether the party is celebrating a special occasion (362). The window 352 also includes a data entry field 363 which is used to block out the corresponding time-slot 332 A merchant would block out a time-slot 332 to prevent it from being reserved, thus providing the merchant with flexibility to assign the table on an ad-hoc basis. Returning to our example, when the merchant inserts the above-defined customer information into fields 354–362, the merchant is then required to select the "GO" icon 364 to make the reservation. When this occurs, the spreadsheet 324 of FIG. 17 is automatically updated to indicate that the telephoning party has reserved the requested time-slot 332. This is accomplished because the software product 50 writes the customer information captured in window 352 into the records in the merchant database 76 corresponding to the selected time-slot 332. The software product 50 would be operated in a similar manner for a walk-in at the merchant's establishment. The spreadsheet 324 thus has the ability to graphically display all the bookings for a particular day regardless if made by customers using the Internet, by telephone or walk-ins. In alternative embodiments, the window 352 can appear as a separate web page or can appear as a window overlapping a portion of the spreadsheet 324 of FIG. 17.

Figure 19:
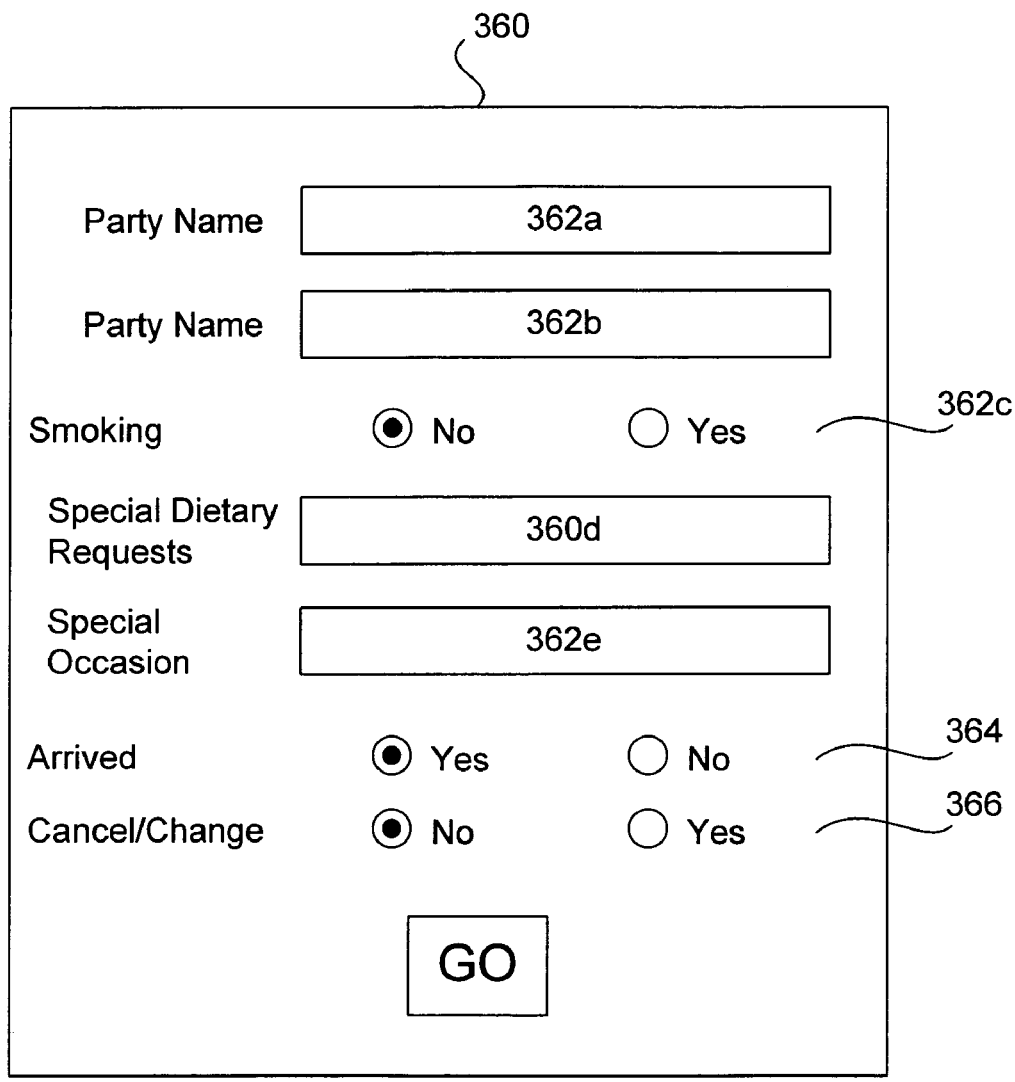
FIG. 19 is an exemplary web page that allows a merchant to confirm that a party with a booking has arrived at the merchant's place of business.

The software product 50 also allows a merchant to update the software product 50 when a party with a reservation arrives at the restaurant. When this occurs, the merchant is required to find the Party's reservation, either visually on the spreadsheet 324 or using the data entry field 334 of FIG. 17. Once the Party's time-slot 332 is found, it is selected by the merchant. This causes, as illustrated in FIG. 19, a window 360 to appear. The window 360 includes a text fields 362a–362e where the Party's name, size, smoking or non-smoking preference, special request information, etc., is displayed. The window 360 also includes a data entry field 364 which allows the merchant to indicate if the Party has arrived. When the merchant submits that the Party has arrived, the window 360 disappears from the spreadsheet 324 and the corresponding time-slot 332 is automatically highlighted to indicate that the Party has arrived and is being seated. The window 360 also includes a field 366 which allows the merchant to change/cancel a reservation. Again in alternative embodiments, the window 360 can appear as a separate web page or as a window overlapping a portion of the spreadsheet 324 of FIG. 17.

The software product 50 also allows a merchant to modify or cancel a reservation after it has been made. For example, if Mr. Spielberg called ahead of time and requested to change his reservation at the designated time, the merchant would visually search and find the time-slot 332 reserved in his name on the spreadsheet 324. In the alternative, "Spielberg" could be entered into data entry field 334 to automatically locate the time-slot 332 reserved by Mr. Spielberg. In either way, the merchant would then select the reserved time-slot 332 and cut and paste it to another available time-slot 332 on the spreadsheet 324 for the same day or another day. The cut and paste operation causes the user information stored in the original records in the database 76 to be cut and moved to a second set of records corresponding to the second time-slot 332. In an alternative embodiment, the merchant can select the time-slot 332 causing the window 360 of FIG. 19 to appear. By selecting the "Yes" icon associated with the cancel/change data entry field 366, the reservation record in the database 76 is removed, canceling the reservation. If the Party wishes another time, the reservation can be made by using the same steps as provided above.

As previously noted, web page 300 of FIG. 15 includes the hot link 304 for Direct Marketing, the hot link 305 to revise the web site and the hot link 306 to create table reservation templates. Each of these features are now described below.

Figure 19A:
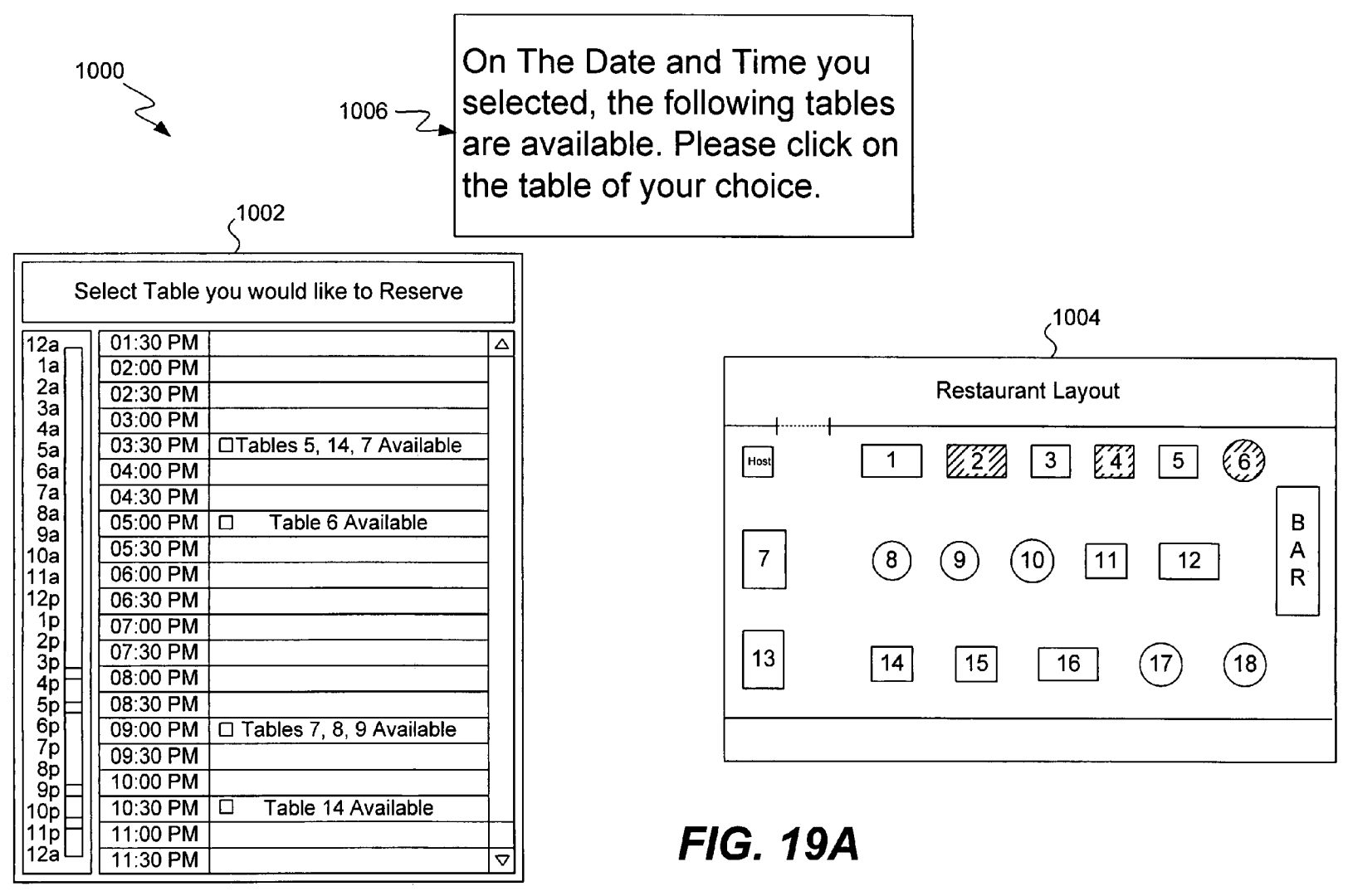

Referring to FIG. 19A, a web page for making a reservation according to another embodiment of the invention is illustrated. The web page 1000 includes a chart 1002, a graphical representation of the table layout 1004 of the restaurant, and a text field 1006 for displaying instructions to make a reservation. When a reservation request is made for a given date and time, the database 76 is quiried. In response, the available tables for the selected day are displayed in chart 1002. In table layout 1004, the tables available at the specified time are displayed (i.e., the available tables may be displayed in one color and the previously reserved tables are displayed in a second color. A table can be reserved by selecting an available table in either the chart 1002 and/or the table layout 1004. In this manner, reservations can be made by the restaurant into the database 76 for persons requesting reservations by phone, walk-ins, etc. Reservations can also be made in a similar manner by Internet users.

Figure 20:
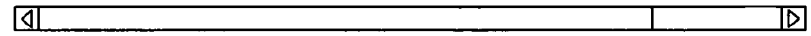
FIG. 20 is an exemplary web page that allows a merchant to directly communicate with customers by electronic message.

Referring to FIG. 20, a web page 400 for performing direct marketing by the merchant is illustrated. The web page 400 appears after the merchant selects the hot link 304, which causes the mail module 58 of the software product 50 to be accessed. The web page 400 includes a text entry field 402 for entering messages and a "GO" icon 404 for emailing the message(s) entered into the text entry field 402 to Internet users stored in the database 76 affiliated with the merchant. The web page 400 thus provides the merchant with a highly effective, easy to use, electronic tool to communicate with their customer base. For example, the merchant can use this tool to inform customers of promotions, specials, upcoming events, open reservations, electronic newsletters, etc. This feature can therefore significantly help the merchant's business by creating a sense of community among customers, and by using promotions to entice customers to increase traffic at the merchant's place of business. The mail module 58 can also be programmed to automatically send out emails to Internet users. For example, the mail module 58 can be programmed to send out a reminder of a reservation to an Internet user a predetermined time prior to a booked reservation. The mail module 58 could also be programmed to automatically send out an email the day after a reservation asking for feedback on their dining experience. The email, in one embodiment, could include some type of a promotional reward or electronic coupon to encourage a reply email and to entice the user to return to the establishment. In yet another embodiment of the invention, an individual merchant 74 could pay or otherwise barter for access to other Internet users that are part of the super-community 72.

Figure 21:
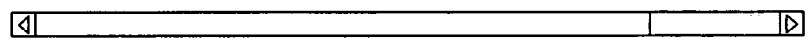
FIG. 21 is an exemplary web site that allows a merchant to access different portions of their web site (FIG. 8) for editing.

Referring to FIG. 21, a web page 410 for revising the merchant's web site is shown. The web page 410 appears after the merchant selects the hot link 305 of the web page 300 as illustrated in FIG. 15, which causes a portion of the web helper module 52 of the software product 50 to be accessed. The web page 410 includes a pull down menu 412 which allows the merchant to select which portion of the web site of FIG. 8 is to be revised. Again using a restaurant example, the entries for the pull down menu 412 may include specials, the food menu, the wine list, reviews, etc. Once the merchant has selected the portion of the web site to be revised, the "GO" icon 414 is selected to make the actual changes.

Figure 22:
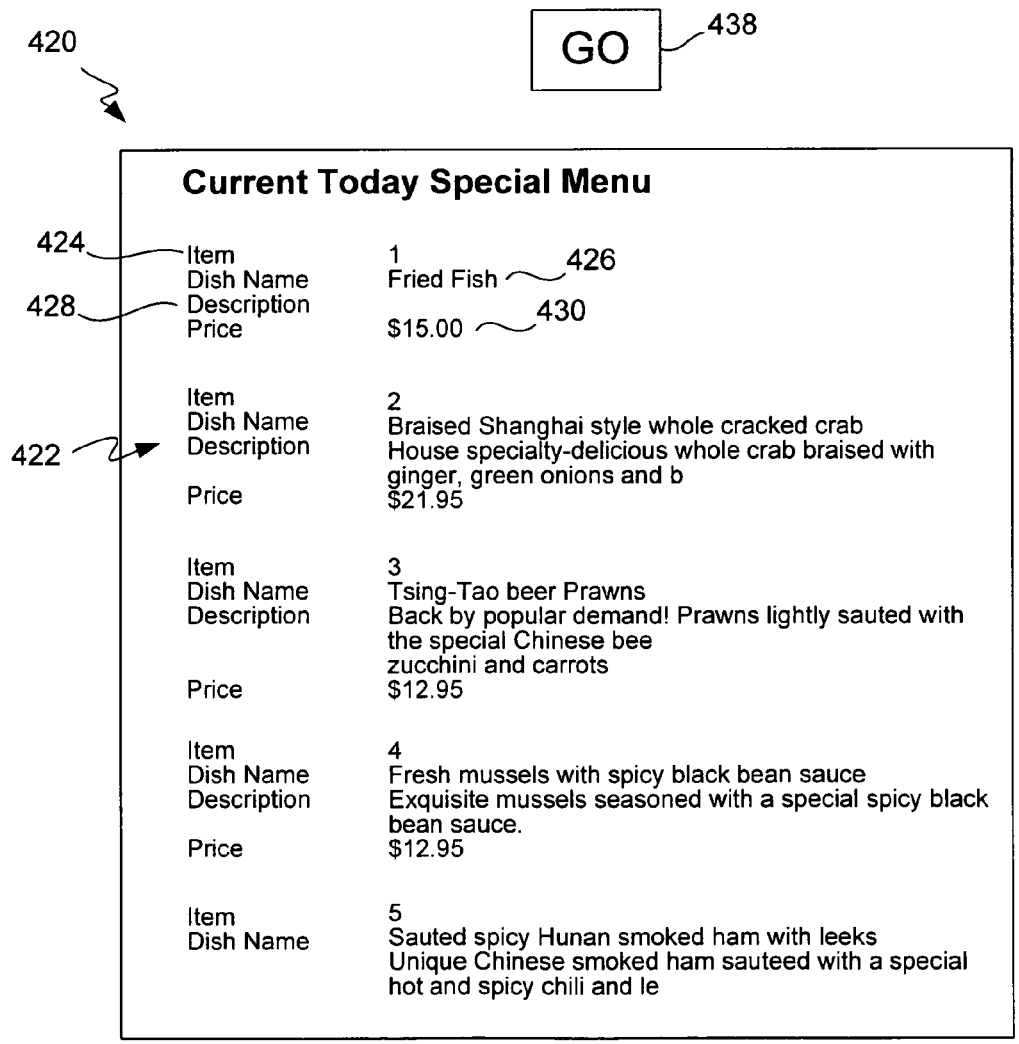
FIG. 22 is an exemplary web site that allows a merchant to edit a selected portion of their web site.

Referring to FIG. 22, a web page 420 for revising the merchant's food menu is shown. The web page 420 appears when the merchant selects the "food menu" using the pull down menu 412 of web page 410 of FIG. 21. The web page 420 includes a text field 422 which lists each item on the food menu. Each item is identified by an item number 424, a description of the item 428, and an item price 430. The web page 420 also includes data entry fields for entering an item number (field 432), a dish name 433, a description of the item (field 434) and the price of the item (field 436). To revise an existing item listed in the text field 422, the merchant is simply required to type the item number 424 into the field 432, the name of the new dish into field 433, the new description of the item into field 434, and the price into field 436. When the "GO" icon 438 is selected on the merchant's computer, the item number 424 in the text field 422 will automatically be updated with the new dish name, description and price. New items are added in an identical manner. To add a new item in the example shown in FIG. 22, the merchant would be required to enter an item number "6" into the field 432 and then enter the dish name, description and price. This feature allows a merchant to quickly, inexpensively and easily revise and maintain an up-to-date web site. The merchant can therefore keep the Internet using public informed on the latest happenings at her place of business. Thus in embodiments of this invention where the server 12 hosts the merchant's web site, a merchant can update his or her web site from a remote location over the Internet 18.

Super-Community Embodiments

As previously discussed, the software product 50 of the present invention enables the creation of web "super-communities" made up of the aggregate of the individual merchants in a given vertical market. A description of how the super-community concept is implemented in two exemplary embodiments is described below.

Figure 23:
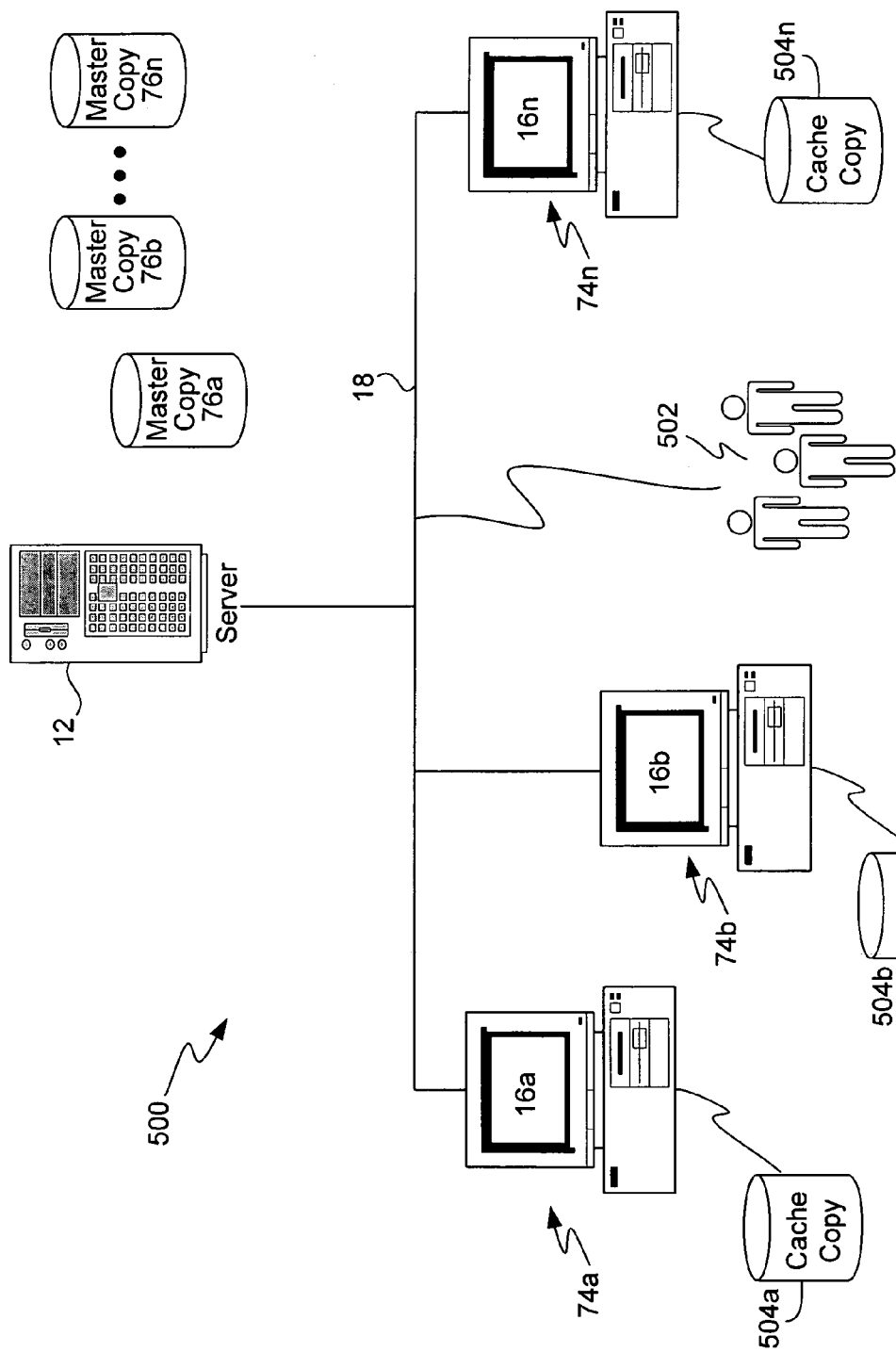
FIG. 23 is a web super-community created by one embodiment of the present invention.

Referring to FIG. 23, a block diagram illustrating the implementation of a web super-community is shown. The super-community 500 includes a server 12 executing the software product 50, a plurality of merchants 74a–74n each operating a computer 16a–16n respectively, and coupled to the server 12 via the Internet 18. Also included in the super-community 500 are the Internet users designated by reference number 502. A master copy of the databases 76a–76n of customers and reservation information for each merchant 74a–74n is stored on the server 12. In the aggregate, the master copies of the merchant databases 76 form the "super-community" of Internet users 502 and merchants 76a–76n. A cache copy 504a–504n of the reservation information pertinent to each merchant 74a–74n is locally stored on the merchant's computer 16a–16n respectively. In this embodiment, the server 12 is used to execute the software product 50 and to host the web sites 170 (FIG. 8) of each of the merchants 76a–76n in the super-community 500. As previously noted, these web sites 170 along with the host web site 90 (FIG. 5) are accessible over the Internet 18 by both users 502 and the individual merchants 76a–76n.

A user 502 seeking to book a reservation at one of the merchants 76 can do so as described in relation to FIGS. 6–12 above. If the user 502 is undecided as to where to make a reservation, the search windows 112 and 130 (FIG. 6A) empowers the user 502 to find and peruse the web sites of various merchants 76 affiliated with the super-community 500. Alternatively, the user can go directly to the web site of an affiliated merchant 76 if they know the URL for that site. In either case, the user's information captured in data entry window 232 (FIG. 11) and their reservation booking information is captured and stored in the master database 76 affiliated with the merchant 74 on the server 12. This information is then automatically written via the Internet 18 to the cache copy 504 on the computer 16 of the merchant 76. The merchant therefore has a local "back-up" copy of all the reservation and user information pertinent to the merchant. This information could be beneficial in the event the Internet 18 was down or the server 12 was otherwise inaccessible by the merchant 76. In an alternative embodiment, the user may not receive an automatic confirmation of a reservation until the merchant's computer 16 has sent an acknowledgement that the booking has been written to the cache copy 504 of the merchant. This would prevent an Internet user 502 from believing that a reservation has been booked with the merchant when in fact it has not, typically due to a technical difficulty such as the merchant's computer 16 or the Internet 18 being down.

Similarly, a merchant 76 can access their Maintenance Center (hot link 132 of FIG. 6A) and access and manage their bookings, perform direct marketing, service their web sites, etc. as described with respect to FIGS. 15–22. The merchant 76, just like a web user 502, can also make a booking for either a party seeking to make a reservation via the telephone or as a walk-in, using their computer 16 to access their database 76 located on the server 12 over the Internet. The only difference being is that in the case of the merchant 76, the booking is made through the Maintenance Center as described above. Again in various embodiments of the invention, reservations made by the merchant for either walk-in or telephone-in customers, can be written into the cache copy 504 of the computer 16 residing at the merchant's place of business.

Figure 24:
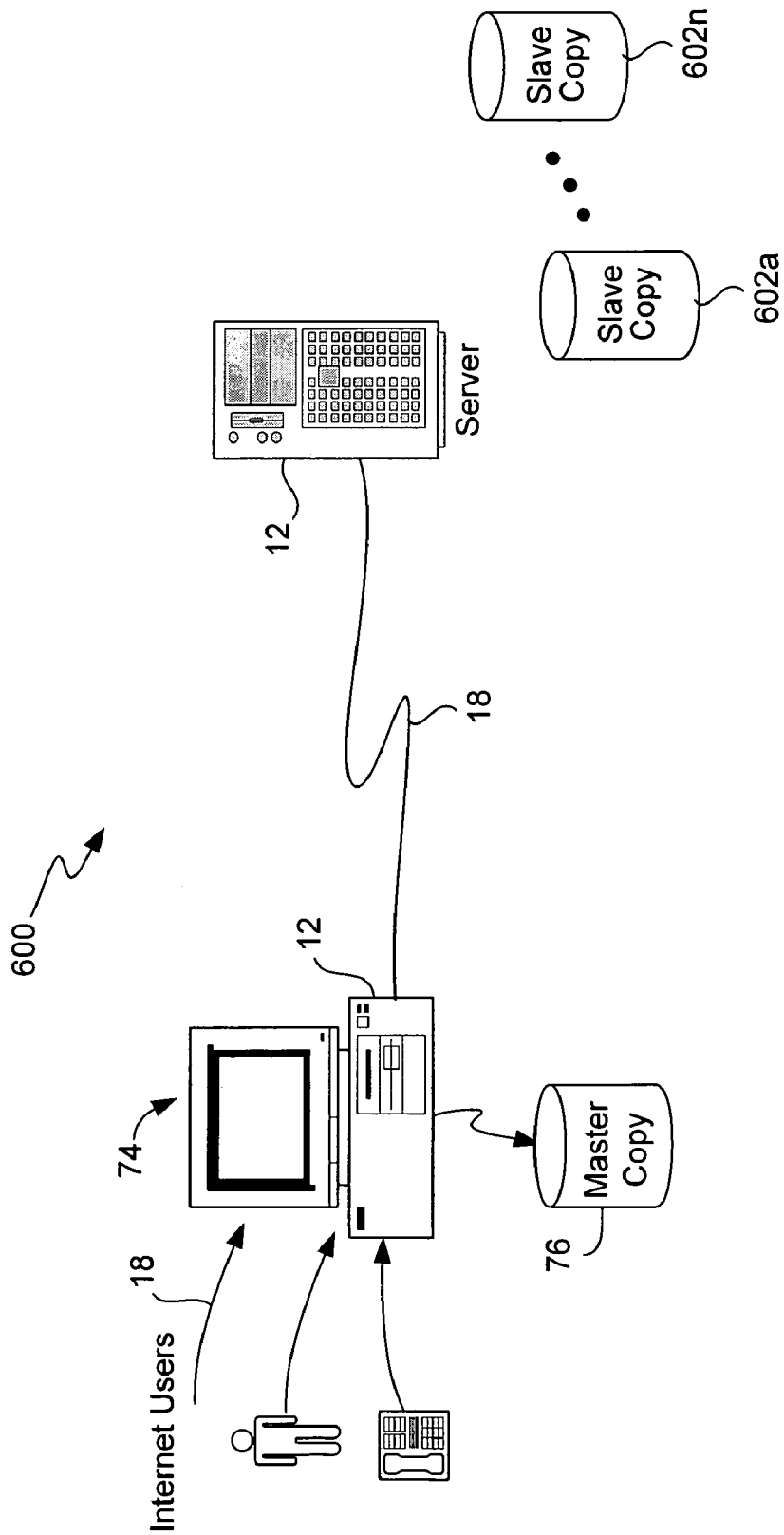
FIG. 24 is a web super-community created by another embodiment of the present invention.

Referring to FIG. 24, a block diagram illustrating another implementation of a super-community is shown. The super-community 600 includes a server 12 and a plurality of computers 12, each associated with a merchant 76 in the super-community 600 (for the sake of clarity, only one computer 12 is shown). In this embodiment, each computer 12 at a merchant 76 location is an SQL server or a similar server capable of hosting a web site and maintaining and accessing a database. The computer 12 is used to host the merchant's web site (FIG. 8) and maintain a master copy of the database 76 that contains the user information and reservation information for the merchant 76. When a reservation is made, either via the Internet 18, or by a walk-in or by a customer over the telephone, that customer and reservation information is stored in the master copy 76. This same information is also sent over the Internet 18 to a slave copy of the database 602 maintained on the server 12. Again in the aggregate, the slave copies 602a–602n of all the merchants 76a–76n make up the super-community 600. In this embodiment, the server 12 would host the super-community web page (i.e. FIGS. 6A, 6B, 6C, 7 and 8) and the hot links 142 for each merchant's web site (FIG. 7) would link the Internet user to the computer 12 of the merchant 76.

Database Hierarchy

Figure 25:
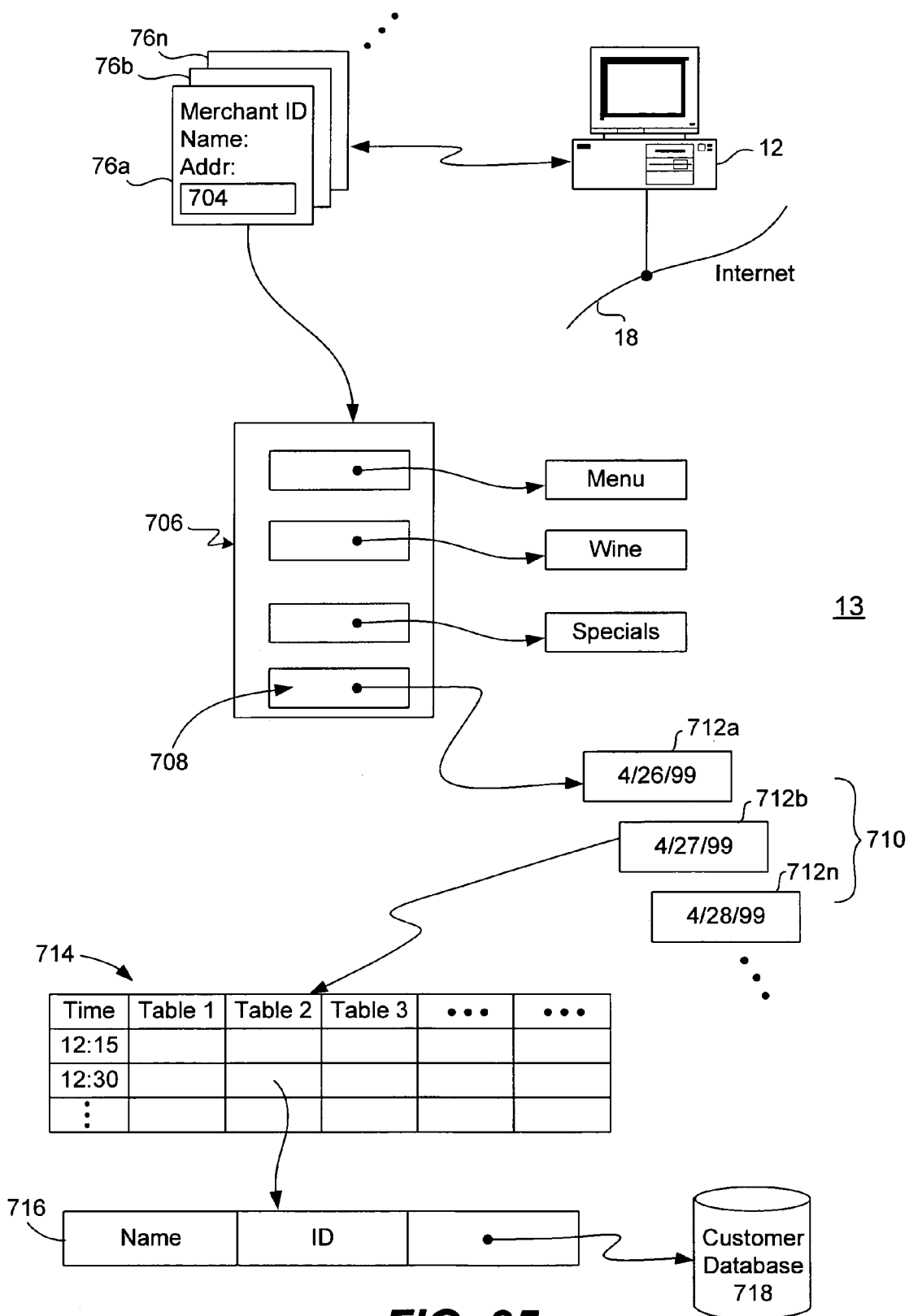
FIG. 25 is a block diagram illustrating a relational database incorporated into the software product of the present invention.

Referring to FIG. 25, a block diagram illustrating the hierarchy of the database 13 used in the software product of the present invention is shown. The database 13 (FIG. 4) is a relational database which includes a plurality of sub-databases 76a–76n for each merchant respectively. Each sub-database 76 includes records which contain a merchant ID, merchant name and address, and a pointer 704 which points to another sub-database 706 specific to the merchant identified in the sub-database 76. The sub-database 706 includes a plurality of pointers, each pointing to all the components of the web site for the merchant. In the embodiment shown in FIG. 25, the sub-database 706 includes pointers to the merchants menu, wine list, specials etc. and pointer 708 which points to another sub-database 710 which contains the booking information for the merchant. The sub-database 710 includes a plurality of records 712a–712n, each for a specific day. The records 712 include a database structure 714 that a plurality of time-slots. Each time-slot, for the restaurant example, is identified by a table number and a time increment. For other vertical markets, the appropriate descriptors would be used to identify each time-slot. The database structure 714 also contains a pointer for each time-slot. In the event a given slot is booked, the pointer points to a record 716 that contains the name and ID of the person that has reserved the slot. The record 716 also includes a pointer that points to a record containing all the membership information of the person booking the time-slot in a customer database 718. The customer database is therefore a large database that contains the aggregate of the individual records, including the membership information, of each user-customer for all the merchants, thus defining a super-community of users.

Product Operation (Flowchart)

Figure 26:
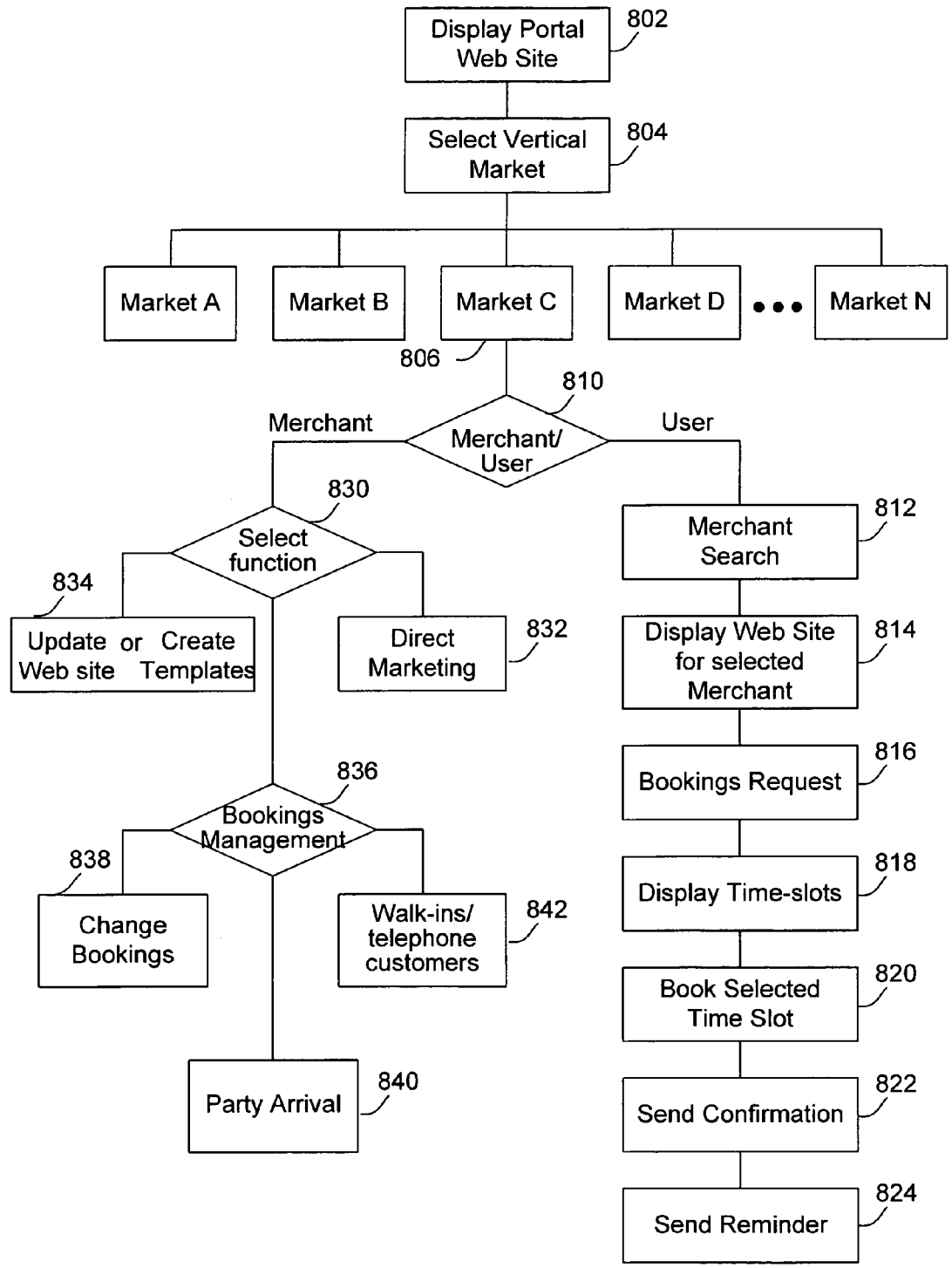
FIG. 26 is a flowchart illustrating the operation of the software product of the present invention.

Referring to FIG. 26, a flowchart illustrating the operation and sequence of the software product 50 of the present invention is shown. Initially the portal web site of FIG. 5 is accessed (box 802). The viewer, either an Internet user or a merchant, then selects a vertical market (box 804). Once a vertical market is selected, the web page of FIG. 6A which is an example of a home page for a vertical market is displayed (box 806). At decision diamond 810, an Internet user can proceed with making a booking over the Internet or a merchant can access the Merchant Center by selecting the appropriate links provided on the web page of FIG. 6A.

In the case of an Internet user, a search query is typically submitted to identify one or more merchants in the vertical community (box 812). The user can then view the web sites for the merchants (box 814) meeting the search criteria and make a booking request (box 816) at a selected merchant. The software product then displays to the user both available and not available time-slots during the time period defined by the user at the merchant's place of business (box 818). The user is then able to book a selected time-slot (box 820) which is automatically written in the merchant's database 76. The software product 50 sends an email confirmation to the user after the booking has been made (box 822) and subsequent reminder emails (box 824).

Merchants on the other hand are required to decide (decision diamond 830) whether they would like to perform direct marketing (box 832), update their web site (box 834), or manage their bookings. In the event the management of the bookings is selected (diamond 836), the merchant must elect if the booking transaction involves a change in a party's booking (box 838), the arrival of a party (box 840), or a booking for a walk-in or a telephone customer (box 842).

On-Line Auctions

The software product 50 of the present invention also provides merchants with the ability to create on-line auctions for time-slot inventory. Under certain business conditions where the demand for time-slots is very strong, the merchant may wish to sell bookings to the highest bidder, rather than at the regular cost for the booking. For example, a hotel located near the stadium where a major sporting event is to occur, such as the Super Bowl, may wish to auction its room booking for the weekend of the big game. Given the high demand for conveniently located hotel rooms, there is a strong likelihood that the final bid for the room would be higher than the standard price for the room.

Figure 27:
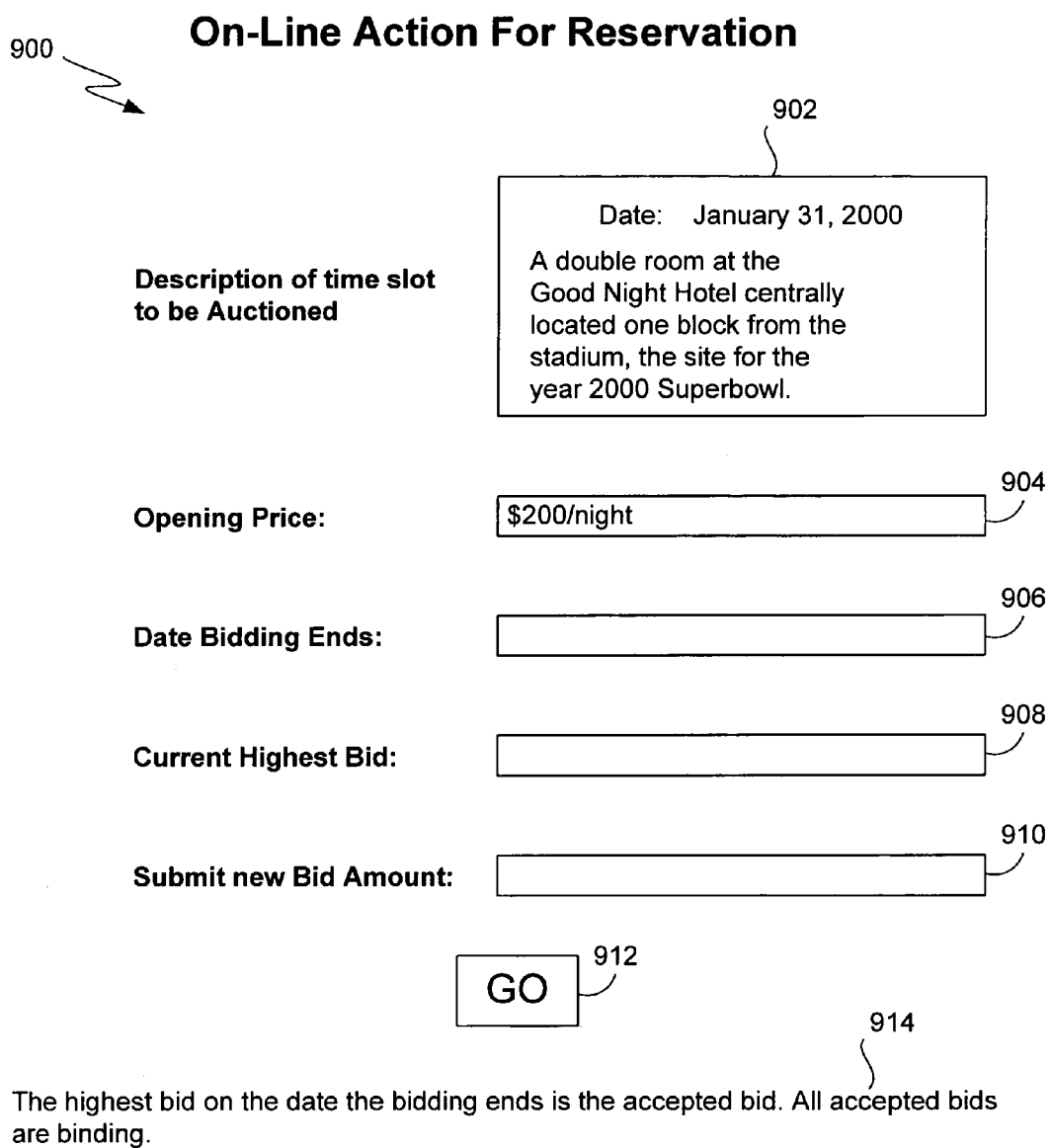
FIG. 27 is an exemplary web page for auctioning time-slot reservations over a network.

Referring to FIG. 27, an exemplary web page 900 used for holding an Internet auction for a time-slot. The page 900 includes a window 902 that provides a brief description of the available time-slot, a window 904 for the merchant to enter the opening price, a window 906 for providing the date for the close of the bidding, a window 908 for providing the current highest bid, and a data entry field 910 in which registered users can enter bids when the "GO" icon 912 is selected. The text message 914 informs the Internet user that their bid will be binding if accepted. The web page 900 therefore allows Internet users to submit bids for the time-slot. Since the reservation will typically go to the highest bidder, the merchant may generate more revenue than by offering the reservation at the standard rate on a first-come first-serve basis.

The software product of the present invention provides numerous opportunities for Internet users, merchants, and the host of the "super-communities". For Internet users, the present invention provides selection, speed and immediacy in making bookings at merchants affiliated with the super-community. It allows merchants to participate in the Internet revolution like never before, send direct marketing correspondence to customers, and automate their reservation booking process. And finally, the host of the super-community can enjoy numerous e-commerce benefits, such as selling advertising space, goods and other services to the members of the super-community. While the invention has been described in relationship to the embodiments shown in the accompanying figures, other alternatives, embodiments and modifications will be apparent to those skilled in the art.

It is intended that the specification be only exemplary, and that the true scope and spirit of the invention be indicated by the following claims.

We claim:

1. A software product comprising:
    a first restaurant reservation booking database having a plurality of records, the plurality of records corresponding to a plurality of time-slots for tables at the first restaurant;
    a restaurant table reservation management module configured to enable the first restaurant to book time-slots in the first reservation booking database to reserve the tables at the first restaurant for customers not making bookings over the Internet; and
    an Internet booking module configured to enable an Internet user to book an available one of the time-slots to reserve one of the tables at the first restaurant; and
    an update module configured to update over an always on non-dial up internet connection a copy of the first reservation booking database maintained at a central computing location, the update module configured to update the copy of the first reservation booking database in a substantially real time when the first reservation booking database is updated.

2. An apparatus comprising:
    a reservation booking database means having a plurality of records, the plurality of records corresponding to a plurality of time-slots for tables at a restaurant;
    a web site module means for creating an Internet web site to enable an Internet user to book a table at the restaurant, the web site module means further comprising:
        a time-slot display module means for displaying one or more available time-slots corresponding to one or more tables at the restaurant's place of business; and
        a booking module means for enabling the Internet user to book one of the available time-slots in the reservation booking database; and
    a restaurant maintenance module means for providing the restaurant access to the restaurants table reservation booking database means, the restaurant maintenance module means further comprising:
    a table reservation management module means for enabling the restaurant to book time-slots in the reservation booking database means to reserve tables at the restaurant for customers not making bookings over the Internet
    a first computer means located at the restaurant, the first computer means configured to store a first copy of the reservation booking database means;
    a second computer means located at a location remote from the restaurant, the second computer means configured to store a second copy of the reservation booking database means; and
    the first computer means being connected to the second computer means through the internet, the first computer means being configured to be connected to the internet using an always connected, non-dial up connection, to the internet so that the first computer means and the second computer means can synchronize the second copy of the reservation booking database means when the first copy of the reservation booking database on the first computer means is updated.

3. The apparatus of claim 2, wherein the always connected, non-dial up connection includes one of the following types of connections: cable modes, wireless modems, DSL lines, or T-1 lines.

4. A reservation system comprising:
    a reservation booking database having a plurality of records, the plurality of records corresponding to a plurality of time-slots for tables at a selected restaurant;
    a central computing location configured to host an Internet web site for booking reservations:
    an Internet search module configured to identify the selected restaurant in response to a search request submitted by an Internet user to identify the selected restaurant affiliated with the web site;
    a time-slot display module configured to display one or more available time-slots each corresponding to one or more tables at the selected restaurant's place of business; and
    a booking module configured to permit the Internet user to book one of the available time-slots to reserve the corresponding table in the reservation booking database;
    a local computer located at the selected restaurant, the local computer configured to cooperate with the central computing location and including a table reservation management module configured to permit the selected restaurant to book timeslots in the reservation booking database to reserve tables at the selected restaurant for customers not making bookings over the Internet;
    the local computer being further configured to store the reservation booking database;
    the central computing location being further configured to store a second copy of the reservation booking database; and
    the local computer being connected to the central computing location through an always on non-dial up connection to the internet so that the local computer and the central computing location can synchronize the second copy of the reservation booking database when the first copy of the reservation booking database on the local computer is updated.

5. The reservation system of claim 4, further comprising a second reservation booking database located on the local computer, the second reservation booking database configured to be a duplicate of the first reservation booking database associated with the selected restaurant.

6. The reservation system of claim 5, further comprising an update module located at the central computing location, the update module configured to update the second reservation booking database located at the local computer of the selected restaurant when the Internet user books one of the available time-slots in the reservation booking database of the selected restaurant.

7. The reservation system of claim 5, further comprising an update module located at the local computer, the upgrade module configured to update the reservation booking database located at the central computing location when the selected restaurant books one of the available time slots in the second reservation booking database of the selected restaurant.

8. The reservation system of claim 4, wherein the table reservation management module is further configured to permit the selected restaurant to manage a selected portion of its time-slots for table bookings made by both Internet users through the booking module or by non-Internet users.

9. The reservation system of claim 4, wherein the table reservation management module further comprises a restaurant display module configured to permit the selected restaurant to display the available and the booked time-slots for the tables at the selected restaurant's place of business during a time period defined by the selected restaurant.

10. The reservation system of claim 9, wherein the restaurant display module is further configured to display the bookings of time-slots for tables previously booked at the selected restaurant by Internet users through the booking module.

11. The reservation system of claim 9, wherein the restaurant display module is further configured to display the bookings of time-slots for tables previously booked for customers by the selected restaurant through the table reservation management module.

12. The reservation system of claim 9, wherein the time-slots in the time-slot inventory displayed by the restaurant display module provides pointers to corresponding records among the plurality of records in the reservation booking database of the selected restaurant.

13. The reservation system of claim 12, wherein the corresponding record contains fields configured to store customer information related to the time-slot booked in the name of the customer.

14. The reservation system of claim 13, wherein the corresponding record includes at least one of the following fields: a name field for storing the name of the customer; a mailing address field for storing the mailing address of the customer; an email address field for storing the email address of the customer; a phone number field for storing the phone number of the customer; a credit card field for storing the credit card information of the customer; and a password field for storing the password information of the customer.

15. The reservation system of claim 13 wherein the corresponding record includes at least one of the following fields: a smoking field to indicate if the customer requires a smoking table; a special occasions field to indicate if the customer is celebrating special occasion; and a dietary request field to indicate if the customer has a special dietary request.

16. The reservation system of claim 9, further comprising a restaurant data entry module configured to allow the selected restaurant to write customer information into the record corresponding to the selected time-slot to book the selected time-slot in the name of the customer by the selected restaurant.

17. The reservation system of claim 9, wherein each time-slot displayed by the restaurant display module is a link to a second display that displays the customer information in the record corresponding to a booked time-slot when the booked time-slot is selected.

18. The reservation system of claim 9, wherein the table reservation management module further comprises a customer search module to aid the selected restaurant in finding a booked time-slot booked in the name of a specified customer.

19. The reservation system of claim 4, wherein the central computing system further comprises a cancellation module configured to permit the Internet user to cancel a previously booked time-slot for a table booked by the Internet user.

20. The reservation system of claim 4, wherein the local computer further comprising a table layout display module, the table layout display module further configured to display the layout of tables at the selected restaurant's place of business.

21. The reservation system of claim 4, wherein the always connected, non-dial up connection includes one of the following types of connections: cable modems, wireless modems, DSL lines, or T-1 lines.

22. A method comprising:
providing a first restaurant a first reservation booking database having a plurality of records, the plurality of records corresponding to a plural of time-slots for tables at the first restaurant
providing a restaurant table reservation management module configured to enable the first restaurant to book time-slots in the first reservation booking database to reserve the tables at the first restaurant for customers not making bookings over the Internet;
providing an Internet booking module configured to enable an Internet user to book an available one of the timeslots to reserve one of the tables at the first restaurant; and
providing a first computer at the first restaurant, the first computer configured to maintain the first reservation booking database;
providing a copy of the first reservation booking database at a central computing location;
providing an always on non-dial-up internet connection between the first computer and the central computing location; and
updating the copy of the first reservation booking database in substantially real time when the first restaurant books time-slots in the first reservation booking database to reserve tables for customers not making bookings over the Internet.

23. The method of claim 22, further comprising providing the first reservation booking database at the first restaurant's location.

24. The method of claim 22, further comprising aggregating a plurality of reservation booking databases associated with a plurality of restaurants at the central computing location.

25. The method of claim 22, further comprising maintaining a restaurant related web site, affiliating a plurality of restaurants with the web site, and providing the plurality of restaurants a plurality of the reservation booking databases and a plurality of the table reservation management modules respectively.

26. The method of claim 25, further comprising providing a search module with the web site to enable the Internet user to search for a selected restaurant among the plurality of restaurants affiliated with the web site.

27. The method of claim 22, wherein providing the table reservation management module further comprises enabling the first restaurant to manage a selected portion of its time-slots for table bookings made by Internet users and for customers not making reservations over the Internet.

28. The method of claim 22, wherein the providing the table reservation management module further comprises providing a restaurant display module configured to enable the first restaurant to display the available and the booked time-slots for the tables at the first restaurant's place of business during a time period defined by the first restaurant.

29. The method of claim 28, wherein the providing the restaurant display module further comprises configuring the restaurant display module to display the bookings of time-slots for tables previously booked at the first restaurant by Internet users through the Internet booking module.

30. The method of claim 28, wherein the providing the restaurant display module further comprises configuring the restaurant display module to display the bookings of time-slots for tables previously booked for customers by the first restaurant through the reservation table management module.

31. The method of claim 28, wherein the displaying time-slots during the time period defined by the first restaurant further comprises configuring the displayed time-slots to correspond to records among the plurality of records in the first reservation booking database.

32. The method of claim 31, further comprising enabling the first restaurant to write customer information into the records.

33. The method of claim 31, further comprising enabling the Internet user to write customer information into the record through the Internet booking module.

34. The method of claim 31, further comprising configuring the record to include at least one of the following fields: a name field for storing the name of the customer; a mailing address field for storing the mailing address of the customer; an email address field for storing the email address of the customer; a phone number field for storing the phone number of the customer; a credit card field for storing the credit card information, of the customer; and a password field for storing the password information of the customer.

35. The method of claim 22, further comprising providing a customer search module to aid the first restaurant in finding one of the time-slots booked in the name of a customer.

36. The method of claim 22, further comprising providing a cancellation module configured to permit the Internet user to cancel a previously booked time-slot for a table booked by the Internet user at the first restaurant's place of business.

37. The method of claim 22, further comprising providing a table layout display module configured to display the layout of tables at the first restaurant's place of business.

38. The method of claim 37, wherein the providing the table layout display module further comprises displaying booked tables in a first display mode and open tables in a second display mode.

39. The method of claim 38, wherein the first display mode is a first color and the second display mode is a second color.

40. The method of claim 22, wherein the always connected, non-dial up connection includes one of the following types of connections: cable modems, wireless modems, DSL lines, or T-1 lines.

41. An apparatus comprising:
a reservation booking database having a plurality of records, the plurality of records corresponding to a plurality of time-slots for tables at a restaurant;
a web site module configured to create an Internet web site to enable an Internet user to book a table at the restaurant, the web site module further comprising:
a time-slot display module configured to display one or more available time-slots corresponding to one or more tables at the restaurant's place of business; and
a booking module configured to enable the Internet user to book one of the available time-slots in the reservation booking database; and
a restaurant maintenance module configured to provide the restaurant access to the restaurant's table reservation booking database, the restaurant maintenance module further comprising:
a table reservation management module configured to enable the restaurant to book time-slots in the reservation booking database to reserve tables at the restaurant for customers not making bookings over the Internet;
a first computer located at the restaurant, the first computer configured to store a first copy of the reservation booking database;
a second computer located at a location remote from the restaurant, the second computer configured to store a second copy of the reservation booking database; and
the first computer being connected to the second computer through the internet the first computer is configured to be connected to the internet using an always connected, non-dial up connection, to the internet so that the first computer and the second computer can synchronize the second copy of the reservation booking database when the first copy of the reservation booking database on the first computer is updated.

42. The apparatus of claim 41, wherein the web site module further comprises an Internet search module configured to locate the restaurant in response to a search request submitted by the Internet user to locate the restaurant among a plurality of restaurants affiliated with the web site.

43. The apparatus of claim 42, wherein the Internet search module is further configured to locate the selected restaurant based on at least one of the following search criteria: name of the selected restaurant; location of the selected restaurant; or type of cuisine offered by the selected restaurant.

44. The apparatus of claim 43, wherein the web site module is further configured to display the search results of the search request submitted by the Internet user, the search results including at least one of the following types of information for the restaurants meeting the search request the names of the restaurants; the location of the restaurants; the type of cuisine offered by the restaurants; reviews of the restaurants; a price range for the restaurants and posted comments from other Internet users regarding the restarts.

45. The apparatus of claim 41, wherein the time-slot display module of the web site module further comprises a time-slot search module configured to search and display the available time-slots for tables at the restaurant's place of business during a selected time period as defined by the Internet user.

46. The apparatus of claim 45, wherein the time-slot search module is further configured to search and display the available and not-available time slot-increments for tables accommodating a specific party size as defined by the Internet user.

47. The apparatus of claim 41, wherein the booking module of the web site module is further configured to require the Internet user to submit personal information over the Internet to book one of the available time-slots.

48. The apparatus of claim 47, wherein the personal information includes at least one of the following types of information: the Internet user's name; the Internet user's email address; the Internet user's mailing address; the Internet user's phone number; the Internet user's credit card information; and the Internet user's password.

49. The apparatus of claim 47, wherein the booking module of the web site module is further configured to write the personal information submitted by the Internet user into the reservation booking database of the restaurant, the personal information being written into the record in the restaurant's reservation booting database corresponding to the timeslot displayed by the time-slot display module and booked by the Internet user.

50. The apparatus of claim 47, wherein the web site module further comprises a confirmation module configured to generate a confirmation message over the Internet to the Internet user after the personal information has been written to the reservation booking database of the restaurant to confirm the booking of the selected time-slot.

51. The apparatus of claim 41 wherein the web site module further comprises a reminder module configured to send a reminder message over the Internet to the Internet user of the booked time-slot for the reserved table at the restaurant's place of business a predetermined time period prior to the date of the booking.

52. The apparatus of claim 41, wherein the Internet web site further comprises a link module configured to link to a web page associated with the restaurant.

53. The apparatus of claim 41 wherein the restaurant maintenance module further comprises a password module configured to accept a unique password to prevent the unauthorized access to the reservation booking database belonging to the restaurant.

54. The apparatus of claim 41, wherein the table reservation management module is further configured to permit the restaurant to manage a substantial portion of its time-slot inventory for table bookings made by both Internet users through the Web site module or by non-Internet users.

55. The apparatus of claim 54, wherein the table reservation management module further comprises a restaurant display module configured to permit the restaurant to display the available and the booked time-slots for the tables at the restaurant's place of business during a selected time period.

56. The apparatus of claim 55, wherein the restart display module is further configured to display the time-slot inventory of tables at the restaurant, the booked time-slots and the available time-slots during the selected time period.

57. The apparatus of claim 56, wherein the restaurant display module is further configured to display the time-slot inventory of tables and the time increments for the availability of the tables on a computer display.

58. The apparatus of claim 56 wherein the restaurant display module is further configured to display the restaurant's booked and available time-slots for tables at the restaurant in at least one of the following seatings at the restaurant: a dinner seating; and a lunch seating.

59. The apparatus of claim 56, wherein the restaurant display module is further configured to display the bookings of time-slots for tables previously booked at the restaurant by Internet users through the Web site module.

60. The apparatus of claim 56, wherein the restaurant display module is further configured to display the bookings of time-slots for tables previously booked for customers by the restaurant through the table reservation management module.

61. The apparatus of claim 56, wherein the time-slots displayed by the restaurant display module provides pointers to corresponding records among the plurality of records in the reservation booking database of the restaurant.

62. The apparatus of claim 61, wherein the corresponding records contains fields configured to store customer information related to the time-slot booked in the name of the customer.

63. The apparatus of claim 62, wherein the corresponding records include at least one of the following fields: a name field for storing the name of the customer; a mailing address field for storing the mailing address of the customer; an email address field for storing the email address of the customer; a phone number field for storing the phone number of the customer; a credit card field for storing the credit card information of the customer; and a password field for storing the password information of the customer.

64. The apparatus of claim 61, further comprising a restaurant data entry module configured to allow the restaurant to write customer information into one of the records to book an available time-slot in the name of the customer.

65. The apparatus of claim 61, wherein each booked time-slot displayed by the restaurant display module is a link to a second data display that displays the customer information in the record when the booked time-slot is selected by the restaurant.

66. The apparatus of claim 65, wherein the second data display is further configured to display the customer information in the record corresponding to the booked time-slot regardless of whether the time-slot was booked over the Internet by an Internet user or by the restaurant using the table reservation management module.

67. The apparatus of claim 65 wherein the second data display further comprises a data entry field configured to receive data input from the restaurant indicating that the customer that booked the time-slot has arrived at the restaurant.

68. The apparatus of claim 54, wherein the table reservation management module further comprises a customer search module to aid the restaurant in finding one of the time-slots booked in the name of a customer in the reservation booking database.

69. The apparatus of claim 68, wherein the customer search module performs the search using ar least one of the following search criteria: date of booking; name of customer who made the booking; email address of the customer who made the booking; or telephone number of the customer who made the booking.

70. The apparatus of claim 41 wherein the web site module further comprises a first cancellation module configured to permit the Internet user to cancel over the Internet a previously booked timeslot for a table booked by the Internet user at the restaurant's place of business.

71. The apparatus of claim 41, wherein the restaurant maintenance module further comprises a second cancellation module configured to permit the restaurant to cancel a previously booked time-slot for a table at the restaurant's place of business.

72. The apparatus of claim 41, wherein the restaurant maintenance module further comprises a communication module configured to permit the restaurant to send communication messages to Internet users over the Internet.

73. The apparatus of claim 41, wherein the restaurant maintenance module further comprises a block-out module configured to enable the restaurant to selectively block-out time-slots in the reservation booking database so that the blocked-out time-slots can not be booked.

74. The apparatus of claim 41, wherein the web site module is configured to reside on a central computing location coupled to the Internet.

75. The apparatus of claim 74, wherein the restaurant maintenance module for the restaurant, the reservation booking database and the table reservation management module, are further configured to reside at the central computing location and are accessible by the restaurant over the Internet.

76. The apparatus of claim 75 further comprising an aggregate database configured to reside at the central computing location, the aggregate database including the reservation booking databases of a plurality of restaurants affiliated with the web site.

77. The apparatus of claim 75 wherein the restaurant maintenance module for the restaurant is further configured to write updates to the restaurant's reservation booking database over the Internet to a duplicate restaurant reservation booking database located on a computer associated with the restaurant.

78. The apparatus of claim 41, wherein the restaurant maintenance module for the restaurant, including the reservation booking database and the table reservation management module, are configured to reside on a computer affiliated with the restaurant.

79. The apparatus of claim 78, wherein the restaurant maintenance module is further configured to write reservation updates to the restaurant's reservation booking database over the Internet to an aggregate database located at a central computing location, the aggregate database containing the reservation booking databases for a plurality of restaurants affiliated with the web site.

80. The apparatus of claim 41, wherein the web site module further comprising a web page module for the restaurant, the web page module configured to post information pertaining to the restaurant over the Internet.

81. The apparatus of claim 80, wherein the restaurant maintenance module further comprises an editing module configured to permit the selected restaurant to edit the restaurants web page module.

82. The apparatus of claim 41, further comprising a table layout display module, the table layout display module further configured to display the layout of tables at the restaurant's place of business.

83. The apparatus of claim 82, wherein the table layout display module is further configured to display booked tables in a first display node and open tables in a second display mode.

84. The apparatus of claim 83, wherein the first display mode is a first color and the second display mode is a second color.

85. The apparatus of claim 41, wherein the website module is configured to be accessible to the Internet user using a personal computer.

86. The apparatus of claim 85, wherein the website module is configured to be accessible to the Internet using a computing device coupled to the Internet using a wireless device.

87. The apparatus of claim 41, wherein the table reservation management module is further configured to enable the number of records in the reservation booking database for the restaurant to be defined by the restaurant.

88. The apparatus of claim 41, wherein the always connected, non-dial up connection includes one of the following types of connections: cable modems, wireless modems, DSL lines, or T-1 lines.

\* \* \* \* \*